United States Patent
Plesko

(10) Patent No.: US 8,390,909 B2
(45) Date of Patent: Mar. 5, 2013

(54) MOLDED ELASTOMERIC FLEXURAL ELEMENTS FOR USE IN A LASER SCANNING ASSEMBLIES AND SCANNERS, AND METHODS OF MANUFACTURING, TUNING AND ADJUSTING THE SAME

(75) Inventor: George Plesko, Chadds Ford, PA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 112 days.

(21) Appl. No.: 12/888,716

(22) Filed: Sep. 23, 2010
(Under 37 CFR 1.47)

(65) Prior Publication Data
US 2012/0002259 A1    Jan. 5, 2012

Related U.S. Application Data

(63) Continuation-in-part of application No. 12/565,014, filed on Sep. 23, 2009.

(51) Int. Cl.
*G02B 26/08*    (2006.01)
(52) U.S. Cl. ............... 359/199.3; 359/200.7; 359/224.1
(58) Field of Classification Search ............... 359/199.3, 359/200.7, 224.1–224.2
See application file for complete search history.

(56) References Cited

U.S. PATENT DOCUMENTS

| | | |
|---|---|---|
| 3,020,414 A | 2/1962 | Mcknight et al, |
| 3,087,373 A | 4/1963 | Poor et al. |
| 3,532,408 A | 10/1970 | Dostal |
| 3,642,344 A | 2/1972 | Corker |
| 4,034,230 A | 7/1977 | Brill et al. |
| 4,251,798 A | 2/1981 | Swartz et al. |
| 4,286,145 A | 8/1981 | Palmer |
| 4,488,789 A * | 12/1984 | Kenney ................ 359/225.1 |
| 4,805,175 A | 2/1989 | Knowles |
| 4,856,858 A | 8/1989 | Koike et al. |
| 5,003,164 A | 3/1991 | Barkan |
| 5,015,831 A | 5/1991 | Eastman et al. |
| 5,019,764 A | 5/1991 | Chang |
| 5,059,779 A | 10/1991 | Krichever et al. |

(Continued)

FOREIGN PATENT DOCUMENTS

| | | |
|---|---|---|
| JP | 2003315713 A | 11/2003 |
| WO | 2011038072 A | 3/2011 |

OTHER PUBLICATIONS

Oliveira et al., "Dynamic Analysis of Silicon Micromachined Double-Rotor Scanning Mirror", Journal of Brazilian Society of Mechanical Science and Engineering, Oct.-Dec. 2006, vol. XXVIII, No. 4/443.
Search Report for PCT/US2010/049927 completed May 13, 2011.

*Primary Examiner* — James Phan
(74) *Attorney, Agent, or Firm* — Summa, Additon & Ashe, P.A.

(57) ABSTRACT

A laser scanning assembly includes a coil support element having a central axis about which is wound an electromagnetic wire coil and having a flange oriented generally transverse to the central axis. An elastomeric flexural element has a first end coupled to the flange. A permanent magnet has first and second surfaces, a central axis, and a magnetization direction oriented generally transverse to the central axis of the permanent magnet. The magnet is supported by a second end of the elastomeric flexural element. A mirror has a central axis and is mounted on the second surface of the magnet. The central axes of the mirror and magnet are coaxial with the central axis of the coil support element. The elastomeric flexural element provides a return force when the magnet and the mirror are rotated at an angle from the central axis during energization of the electromagnetic wire coil.

3 Claims, 20 Drawing Sheets

U.S. PATENT DOCUMENTS

| | | | |
|---|---|---|---|
| 5,099,110 A | 3/1992 | Shepard et al. |
| 5,115,120 A | 5/1992 | Eastman |
| 5,126,545 A | 6/1992 | Barkan |
| 5,168,149 A | 12/1992 | Dvorkis et al. |
| 5,200,597 A | 4/1993 | Eastman et al. |
| 5,206,492 A | 4/1993 | Shepard et al. |
| 5,252,816 A | 10/1993 | Onimaru et al. |
| 5,258,699 A | 11/1993 | Grodevant |
| 5,262,627 A | 11/1993 | Shepard |
| 5,280,163 A | 1/1994 | Barkan |
| 5,280,165 A | 1/1994 | Dvorkis et al. |
| 5,281,801 A | 1/1994 | Shepard et al. |
| 5,329,103 A | 7/1994 | Rando |
| 5,367,151 A | 11/1994 | Dvorkis et al. |
| 5,373,148 A | 12/1994 | Dvorkis et al. |
| 5,412,198 A | 5/1995 | Dvorkis |
| 5,420,411 A | 5/1995 | Salatto, Jr. et al. |
| 5,422,469 A | 6/1995 | Bard et al. |
| 5,422,471 A | 6/1995 | Plesko |
| 5,422,472 A | 6/1995 | Tavislan et al. |
| 5,464,976 A | 11/1995 | Scofield et al. |
| 5,475,206 A | 12/1995 | Reddersen et al. |
| 5,479,000 A | 12/1995 | Dvorkis et al. |
| 5,484,995 A | 1/1996 | Scofield et al. |
| 5,486,944 A | 1/1996 | Bard et al. |
| 5,506,394 A | 4/1996 | Plesko |
| 5,508,503 A | 4/1996 | Scofield et al. |
| 5,512,744 A | 4/1996 | Scofield et al. |
| 5,519,198 A | 5/1996 | Plesko |
| 5,532,468 A | 7/1996 | Scofield |
| 5,532,480 A | 7/1996 | Scofield |
| 5,539,192 A | 7/1996 | Scofield et al. |
| 5,543,609 A | 8/1996 | Giordano et al. |
| 5,559,319 A | 9/1996 | Peng |
| 5,576,531 A | 11/1996 | Murphy |
| 5,581,067 A | 12/1996 | Grosfeld et al. |
| 5,581,070 A | 12/1996 | Dvorkis et al. |
| 5,583,332 A | 12/1996 | Krichever et al. |
| 5,589,679 A | 12/1996 | Dvorkis et al. |
| 5,594,232 A | 1/1997 | Giordano |
| 5,596,446 A | 1/1997 | Plesko |
| 5,598,070 A | 1/1997 | Coleman |
| 5,600,120 A | 2/1997 | Peng |
| 5,614,706 A | 3/1997 | Bard et al. |
| 5,621,371 A | 4/1997 | Dvorkis et al. |
| 5,625,483 A | 4/1997 | Swartz |
| 5,629,510 A | 5/1997 | Quinn et al. |
| 5,637,856 A | 6/1997 | Bridgelall et al. |
| 5,648,649 A | 7/1997 | Bridgelall et al. |
| 5,656,805 A | 8/1997 | Plesko |
| 5,668,362 A | 9/1997 | Plesko |
| 5,682,029 A | 10/1997 | Dvorkis et al. |
| 5,691,834 A | 11/1997 | Plesko |
| 5,693,929 A | 12/1997 | Dvorkis et al. |
| 5,698,835 A | 12/1997 | Dvorkis et al. |
| 5,705,799 A | 1/1998 | Li |
| 5,712,471 A | 1/1998 | Bremer |
| 5,714,750 A | 2/1998 | Eastman et al. |
| 5,723,851 A | 3/1998 | Salatto, Jr. et al. |
| 5,750,976 A | 5/1998 | Eastman et al. |
| 5,763,863 A | 6/1998 | Grosfeld et al. |
| 5,764,398 A | 6/1998 | Hayakawa |
| 5,786,585 A | 7/1998 | Eastman et al. |
| 5,796,222 A | 8/1998 | Grodevant |
| 5,804,809 A | 9/1998 | Eastman et al. |
| 5,821,521 A | 10/1998 | Bridgelall et al. |
| 5,825,013 A | 10/1998 | Dvorkis et al. |
| 5,866,894 A | 2/1999 | Bard et al. |
| 5,870,219 A | 2/1999 | Plesko |
| 5,874,720 A | 2/1999 | Dvorkis et al. |
| 5,880,452 A | 3/1999 | Plesko |
| 5,917,173 A | 6/1999 | Dvorkis et al. |
| 5,923,025 A | 7/1999 | Dvorkis et al. |
| 5,932,860 A | 8/1999 | Plesko |
| 5,945,658 A | 8/1999 | Salatto, Jr. et al. |
| 5,945,659 A | 8/1999 | Dvorkis et al. |
| 5,955,720 A | 9/1999 | He et al. |
| 5,984,188 A | 11/1999 | Dvorkis et al. |
| 6,056,200 A | 5/2000 | Dvorkis et al. |
| 6,059,188 A | 5/2000 | Difazio et al. |
| 6,102,294 A | 8/2000 | Swartz et al. |
| 6,114,712 A | 9/2000 | Dvorkis et al. |
| 6,129,282 A | 10/2000 | Reddersen |
| 6,142,379 A | 11/2000 | Bard et al. |
| 6,149,061 A | 11/2000 | Massieu et al. |
| 6,152,372 A | 11/2000 | Colley et al. |
| 6,173,895 B1 | 1/2001 | Plesko |
| 6,206,290 B1 | 3/2001 | Giebel et al. |
| 6,227,450 B1 | 5/2001 | Blake et al. |
| 6,230,976 B1 | 5/2001 | Sautter et al. |
| 6,283,372 B1 | 9/2001 | Li |
| 6,303,927 B1 | 10/2001 | Ahten et al. |
| 6,325,288 B1 | 12/2001 | Spitz |
| 6,328,216 B1 | 12/2001 | Colley et al. |
| 6,332,576 B1 | 12/2001 | Colley et al. |
| 6,334,573 B1 | 1/2002 | Li et al. |
| 6,347,744 B1 | 2/2002 | Metlitsky |
| 6,348,773 B1 | 2/2002 | Dvorkis et al. |
| 6,360,949 B1 | 3/2002 | Shepard et al. |
| 6,390,370 B1 | 5/2002 | Plesko |
| 6,439,461 B2 | 8/2002 | Dvorkis et al. |
| 6,491,222 B1 | 12/2002 | Dvorkis et al. |
| 6,527,180 B1 | 3/2003 | Dvorkis et al. |
| 6,527,183 B2 | 3/2003 | Bard et al. |
| 6,540,145 B2 | 4/2003 | Gurevich et al. |
| 6,575,370 B1 | 6/2003 | Dvorkis et al. |
| 6,585,160 B2 | 7/2003 | Dvorkis et al. |
| 6,592,040 B2 | 7/2003 | Barkan et al. |
| 6,607,132 B1 | 8/2003 | Dvorkis et al. |
| 6,612,192 B2 | 9/2003 | Hardy et al. |
| 6,612,496 B1 | 9/2003 | Barkan et al. |
| 6,621,070 B2 | 9/2003 | Ahten et al. |
| 6,637,657 B2 | 10/2003 | Barkan et al. |
| 6,641,043 B1 | 11/2003 | Plesko |
| 6,641,044 B2 | 11/2003 | Plesko |
| 6,648,227 B2 | 11/2003 | Swartz et al. |
| 6,651,888 B1 | 11/2003 | Gurevich et al. |
| 6,657,765 B2 | 12/2003 | Hayashi et al. |
| 6,712,270 B2 | 3/2004 | Leach |
| 6,715,681 B2 | 4/2004 | Dvorkis |
| 6,722,566 B1 | 4/2004 | Drzymala et al. |
| 6,729,545 B2 | 5/2004 | Li et al. |
| 6,769,616 B2 | 8/2004 | Fu et al. |
| 6,775,077 B1 | 8/2004 | Feng |
| 6,817,529 B2 | 11/2004 | Barkan et al. |
| 6,874,689 B2 | 4/2005 | Blake et al. |
| 6,884,993 B2 | 4/2005 | Ahten et al. |
| 6,900,918 B2 | 5/2005 | Orcutt et al. |
| 6,929,184 B2 | 8/2005 | Barkan |
| 6,932,274 B2 | 8/2005 | Dvorkis |
| 6,969,005 B2 | 11/2005 | Otsubo |
| 6,970,275 B2 * | 11/2005 | Cannon et al. ............ 359/213.1 |
| 7,034,370 B2 | 4/2006 | Kuo et al. |
| 7,059,528 B2 | 6/2006 | Barkan et al. |
| 7,071,931 B2 | 7/2006 | Tegreene et al. |
| 7,182,262 B2 | 2/2007 | Wood et al. |
| 7,184,187 B2 | 2/2007 | Cannon et al. |
| 7,204,424 B2 | 4/2007 | Yavid et al. |
| 7,207,489 B2 | 4/2007 | Drzymala et al. |
| 7,246,375 B1 | 7/2007 | Jean et al. |
| 7,281,658 B2 | 10/2007 | Shepard et al. |
| 7,296,750 B2 | 11/2007 | Wood et al. |
| 7,306,154 B2 | 12/2007 | Takahashi |
| 7,325,736 B2 | 2/2008 | Asai et al. |
| 7,379,221 B2 | 5/2008 | Saito |
| 7,387,248 B2 | 6/2008 | Drzymala et al. |
| 7,416,126 B2 | 8/2008 | Wittenberg et al. |
| 7,420,721 B2 | 9/2008 | Takeuchi |
| 7,441,705 B2 | 10/2008 | Shepard et al. |
| 7,614,561 B2 | 11/2009 | Blake et al. |
| 7,667,723 B2 | 2/2010 | Cannon et al. |
| 7,710,627 B2 * | 5/2010 | Yoon et al. ............. 359/224.1 |
| 8,059,324 B2 | 11/2011 | Edmonds |
| 2004/0179254 A1 | 9/2004 | Lewis et al. |
| 2006/0169780 A1 | 8/2006 | Drzymala et al. |

\* cited by examiner

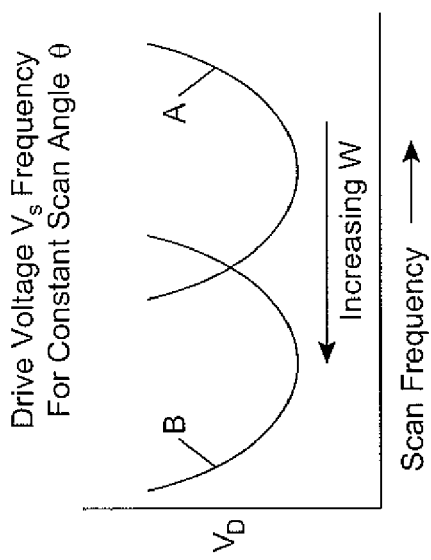
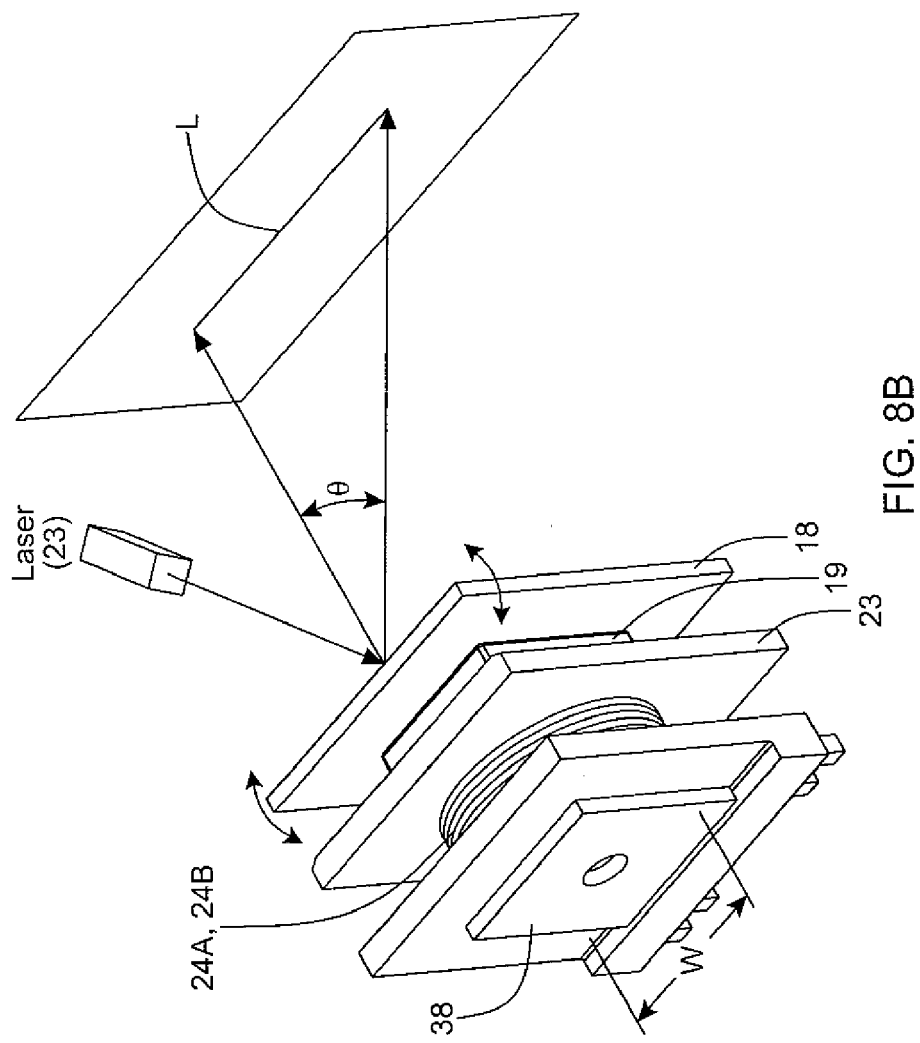

MOLDED ELASTOMERIC FLEXURAL ELEMENTS FOR USE IN A LASER SCANNING ASSEMBLIES AND SCANNERS, AND METHODS OF MANUFACTURING, TUNING AND ADJUSTING THE SAME

RELATED CASES

The Application is a Continuation-in-Part (CIP) of copending application Ser. No. 12/565,014 filed Sep. 23, 2009, now pending; and owned by Metrologic Instruments, Inc. and incorporated herein by reference as if fully set forth herein.

BACKGROUND

1. Field

The present disclosure relates generally to light beam scanners and light beam scanning assemblies and elements, and more particularly, methods of manufacturing, tuning and adjusting the same.

2. Brief Description of the State of Knowledge in the Art

In laser-based barcode scanning equipment, and particularly in portable laser-based barcode scanning equipment, a scan component is used to dither a mirror. The moving mirror is used to sweep a laser beam across a barcode target to be read. This scan component is often called a laser scanning assembly. A laser scanning assembly is a critical component in portable laser-based barcode readers. Desirable attributes for a laser scanning assembly are small size, ruggedness, energy efficiency, freedom from beam shifting when held in different orientations, and immunity to unwanted motions of the scan beam when held by an operator.

In general, the performance of a laser a barcode scanner is defined by a number of factors including: the accuracy and performance of its scanning element; the dynamic characteristics of the scanning element; the size and mass of the scanning element; manufacturability; and energy efficiency.

Conventional flexural element-based laser scanning assemblies are formed from cantilevered beams of plastic film or other flexible materials and are not balanced structures. Several such laser scanning assemblies are described in U.S. Pat. No. 6,173,895 to Plesko, which suffer from unwanted tilting or drooping of the scan mirror when held in different orientations due to the effects of gravity, especially if the scan mirror and moving magnet are large. Further, flexible film flexural elements can become permanently distorted if the device is dropped or otherwise exposed to rough handling. Such distortion produces shifted scan lines or scan lines that are no longer straight.

Shaft-based laser scanning assemblies, such as described in U.S. Pat. No. 7,420,721 B2 to Takeuchi, are also prone to the wobble of the scan mirror induced by gravity or operator movement when used in portable hand held applications. The above-described drawbacks are exacerbated by the use of large scan mirrors required for long range scanning Beam shifting may also be caused by the addition of an inductive pole piece within the electromagnetic drive coil, (see, e.g., U.S. Pat. No. 7,420,721 B2). The pole piece generates a magnetic bias that can tilt the scan mirror or cause unwanted forces, which result in undesirable speed perturbations of the scan line. Thus, tedious adjustment is needed to ensure proper operation of the laser scanning assembly, and may be subject to error.

Further drawbacks associated with conventional laser scanning assemblies are radical bursts of acceleration and deceleration of the scan mirror, which distort the timing of light signals reflected from a barcode target. Distortion often occurs when a pulse of current, such as a short duty cycle square wave, is used as a drive waveform, especially at non-resonant frequencies.

Thus, there is a great need in the art for a new and improved laser scanning assembly that can be used in diverse scanning applications, without the shortcomings and drawbacks of prior scanning apparatus and methodologies.

OBJECTS AND SUMMARY

Accordingly, a primary object of the present invention is to provide a new and improved injection-molded elastomeric (i.e. silicone) flexural element for use in laser scanning assembly, while avoiding the shortcomings and drawbacks of prior art apparatus and methodologies.

Another object is to provide a laser scanning assembly which uses such an injection-molded elastomeric flexural element that is mounted between a mirror and magnet subassembly and the front face of a drive coil support element employed in the laser scanning assembly, so that the mirror and magnet subassembly is supported in a spaced-apart substantially parallel manner from the face of the drive coil support element, and the mirror and magnet subassembly can be dithered to scan a laser beam when an electrical current is supplied to the drive coil at an appropriate frequency, waveform and amplitude.

Another object is to provide a laser scanning assembly which employs an injection-molded elastomeric flexural element of the present invention, and can be driven over a range of scanning speeds below resonance at low power, and controlled under the constant influence of current in a drive coil having no pole piece.

Another object is to provide a laser scanning assembly that exhibits a high degree of immunity to irregular scan speed, beam shifting, unwanted tilting, misalignment, drooping, and damage.

Another object is to provide a laser scanning assembly that is insensitive to temperature variations outside normal operating temperature ranges, and also which responds faithfully to a shaped drive signal, such as a triangle or sinusoidal waveform, to provide non jerky scan speed characteristics.

Another object is to provide a laser scanning assembly that can be economically assembled using automated manufacturing techniques including the use of robotic pick and place tools, and precision liquid dispensing equipment.

Another object is to provide a new and improved method of centering a laser beam on the mirror of a laser scanning assembly, without the need to (i) move the laser source around and then fix it into position using glue, or (ii) moving the scan mechanism itself and then screwing and /or gluing into place when the desired beam position is achieved.

Another object is to provide a new and improved method of tuning the resonant frequency of a laser scanning assembly, without the need of changing (i) the spring constant of the flexural element, and (ii) the moment of inertia of the moving system (e.g. mirror and magnet subassembly) that is dithered, which typically requires the changing of tooled parts.

In summary, a laser scanning assembly is provided for use in scanning a light beam generated from a light source such a laser source. The laser scanning assembly includes a coil support element having a central axis about which is wound an energizable electromagnetic wire coil. The coil support element includes a flange oriented generally transverse to the central axis of the coil support element. At least one elastomeric flexural element is provided having first and second ends. The first end is coupled to the flange of the coil support element. A permanent magnet has first and second surfaces, a central axis, and a magnetization direction. The first surface of the permanent magnet is supported by the second end of the at least one elastomeric flexural element. The central axis of the permanent magnet is coaxial with the central axis of the coil support element. The magnetization direction is oriented generally transverse to the central axis of the permanent magnet. A mirror has a central axis and is mounted on the second surface of the permanent magnet. The central axis of the mirror is coaxial with the central axes of the coil support element and the permanent magnet. The at least one elastomeric flexural element provides a return force when the permanent magnet and the mirror are rotated at an angle from the central axis during energization of the electromagnetic wire coil.

A laser scanning assembly is also provided for use in scanning a light beam from a light source such a laser source (e.g. VLD). The laser scanning assembly includes a coil support element having a central axis about which is wound an energizable electromagnetic wire coil. The coil support element includes a flange oriented generally transverse to the central axis of the coil support element. An elastomeric flexural element has first and second ends. The first end is coupled to the flange of the coil support element. A permanent magnet has a central axis and a magnetization direction. The magnet is embedded within the elastomeric flexural element adjacent to the second end of the elastomeric flexural element. The central axis of the permanent magnet is generally coaxial with the central axis of the coil support element. The magnetization direction is oriented generally transverse to the central axis of the permanent magnet. A mirror has a central axis and is mounted on the second end of the elastomeric flexural element. The central axis of the mirror is generally coaxial with the central axes of the coil support element and the permanent magnet. The elastomeric flexural element provides a return force when the permanent magnet and the mirror are rotated at an angle from the central axis during energization of the electromagnetic wire coil.

A method is provided for forming an elastomeric flexural element for use in a laser scanning assembly. The method includes providing a pair of mold halves that correspond the 3D geometry of the elastomeric flexural element; joining the pair of mold halves together; injecting liquid silicone material into the mold; allowing time for curing; separating the mold halves and removing the injection-molded silicone flexural element.

Also, a method is provided for forming an elastomeric flexural element for a laser scanning assembly. The method includes providing a pair of mold halves that correspond the 3D geometry of the elastomeric flexural element; inserting a magnetic element into at least one of the mold halves; joining the pair of mold halves together; injecting liquid silicone material into the mold; allowing time for curing; separating the mold halves and removing the injection-molded silicone flexural element.

These and further objects will become apparent hereinafter.

BRIEF DESCRIPTION OF THE DRAWINGS

In order to more fully understand the Objects, the following Detailed Description of the Illustrative Embodiments should be read in conjunction with the accompanying figure Drawings, wherein:

FIG. 8B is a schematic representation of an optical bench setup used to tune the resonant frequency of the laser scanning assembly of the first illustrative embodiment, by a method involving the varying of the width (W) of a ferrous tuning plate mounted to the rear surface of the coil support element employed in the laser scanning assembly, and thereby causing a modification of the electromagnetic flux density produced by the electromagnetic coil in the vicinity of the permanent magnet to which the molded elastomeric flexural element is mounted in the laser scanning assembly;

FIG. 9 is a graphical plot illustrating exemplary input drive voltage versus scan frequency characteristics for constant scan angle in the laser scanning assembly of the present invention, for two different cases, namely, (A) without the use of a tuning plate, and (B) with the use of a tuning plate having a width dimension W;

DETAILED DESCRIPTION OF THE ILLUSTRATIVE EMBODIMENTS

Figure 1A:
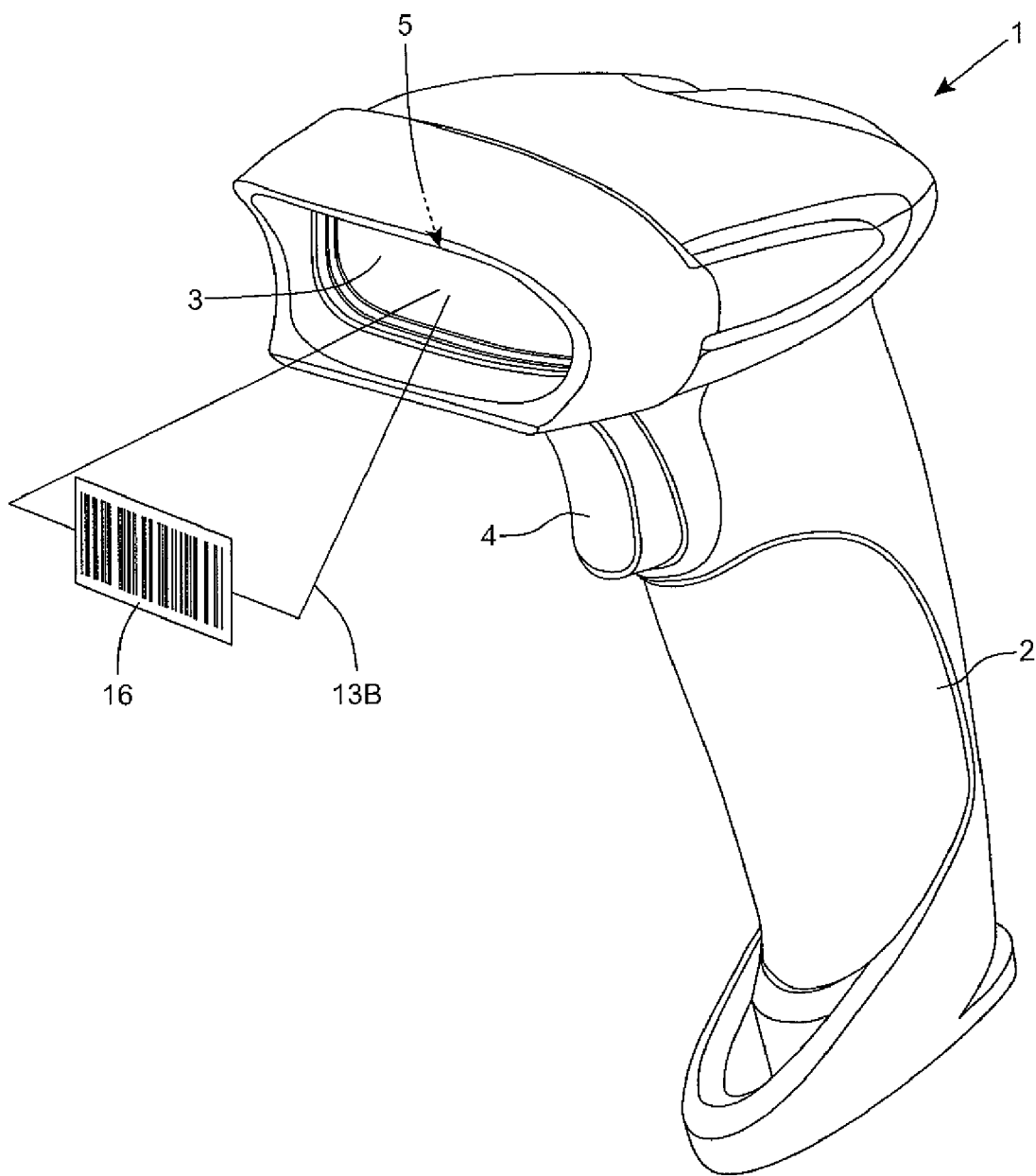
FIG. 1A is a perspective view of a hand-supportable laser scanning bar code symbol reader embodying the laser scanning assembly of a first illustrative embodiment of the present invention.

Referring to the figures in the accompanying Drawings, the various illustrative embodiments of the laser scanning assembly and module will be described in greater detail, wherein like elements will be indicated using like reference numerals.

Also, certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the laser scanning assembly and designated parts thereof. The terminology includes the above-listed words, derivatives thereof, and words of similar import. Additionally, the words "a" and "an," as used in the claims and in the corresponding portions of the specification, shall mean "at least one."

Figure 1B:
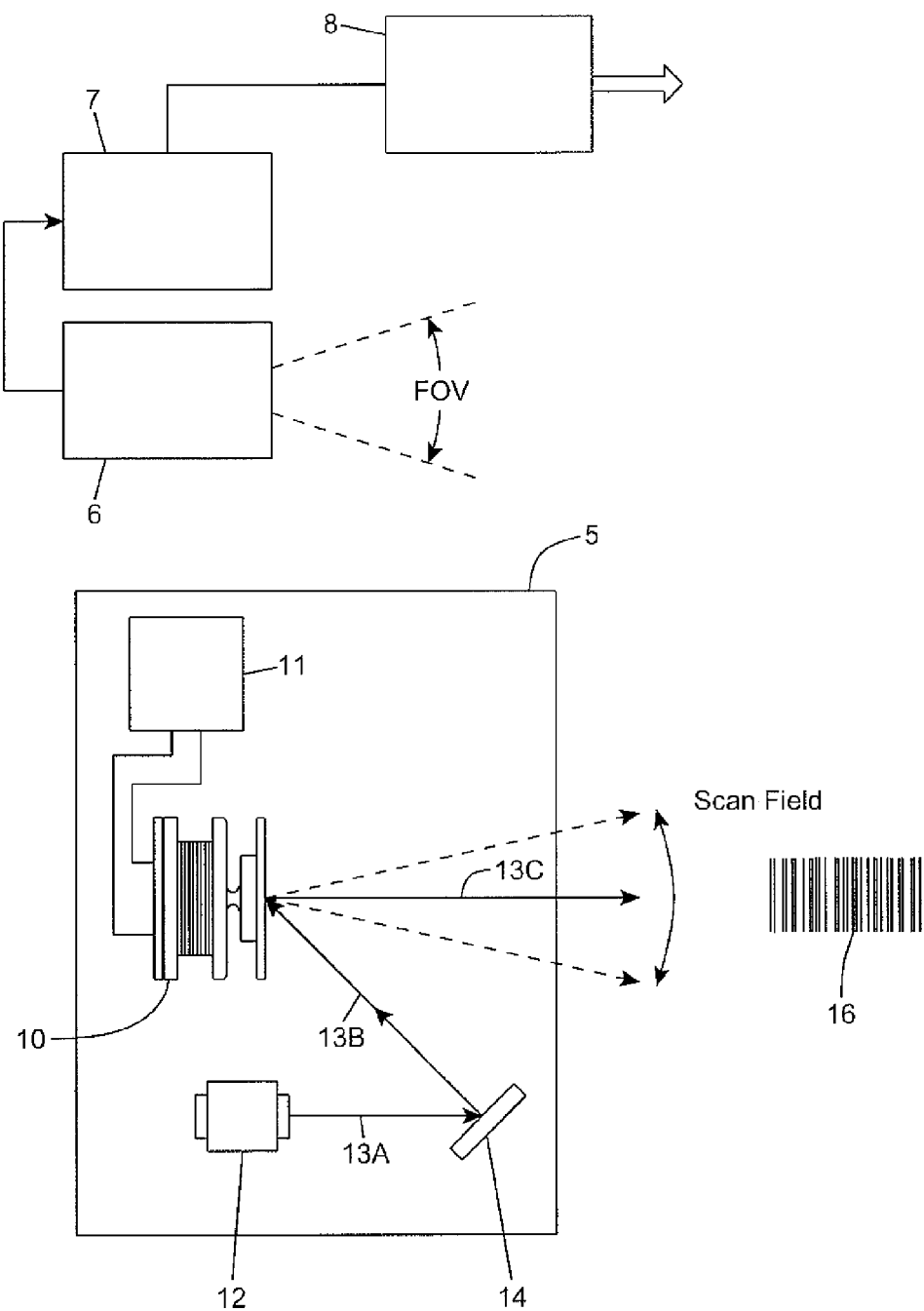
FIG. 1B is a schematic diagram of a laser scanning module employed in the laser scanning bar code symbol reader shown in FIG. 1B, and comprising the laser scanning assembly of the first illustrative embodiment shown in FIG. 2 and arranged together with a laser source, a beam deflecting mirror, light collection optics, photo-detection circuitry, scan data signal processing circuitry, and input/output interface circuitry configured together as shown.

Bar Code Symbol Reading Systems Employing the Laser Scanning Assembly of the Illustrative Embodiments In general, any of the laser scanning assemblies illustrated in FIGS. 2 through 18C, respectively, and the laser scanning module employing the same shown in FIGS. 1A and 1B, can be embodied with any type of host system requiring the scanning of a laser beam for reading bar code symbols and/or other purposes.

However, for purposes of illustration only, the laser scanning module depicted in FIGS. 1A and 1B and the laser scanning assemblies disclosed herein are shown as embodied within a hand-supportable laser scanning bar code symbol reader 1 illustrated in FIG. 1A. It is understood, however, that such laser scanning assemblies and modules can be embodied within any type of code symbol reading requiring linear (i.e. 1D) laser beam scanning operations.

As shown in FIGS. 1A and 1B, the laser scanning bar code symbol reader 1 comprises: a hand-supportable housing 2; a light transmission window 3 integrated with the housing 2; a manually-actuated trigger switch 4, for activating its laser scanning module 5 with laser scanning field (scan field); a light collection module 3 having light collection optics with a field of field (FOV) spatially coincident with the scan field and a photo-detector for producing an electrical scan data signal; a signal processor/decoder 7 for decode processing analog scan data signals produced by the light collection module 6 and generating symbol character data representative of each bar code symbol read; and an input/output (I/O) communication interface module 8 for interfacing with a host communication system and transmitting symbol character data thereto via wired or wireless communication links, supported by the symbol reader and host system.

As shown in FIG. 1B, the laser scanning module 5 of the illustrative embodiment comprises a number of subcomponents, namely: any laser scanning assembly 10 shown in FIGS. 2 through 18C; a coil drive circuit 11 for generating an electrical drive signal to drive the electromagnetic coil 28 in the laser scanning assembly 10; and a laser beam source 12 for producing a laser beam 13A; and optionally, a beam deflecting mirror 14 for deflecting the laser beam 13A from the laser beam source towards the mirror component 15 of the laser scanning assembly 10, which sweeps the laser beam 13C across its scan field and one or more bar code symbols 16 that might be present in such scan field, during system operation.

Figure 2:
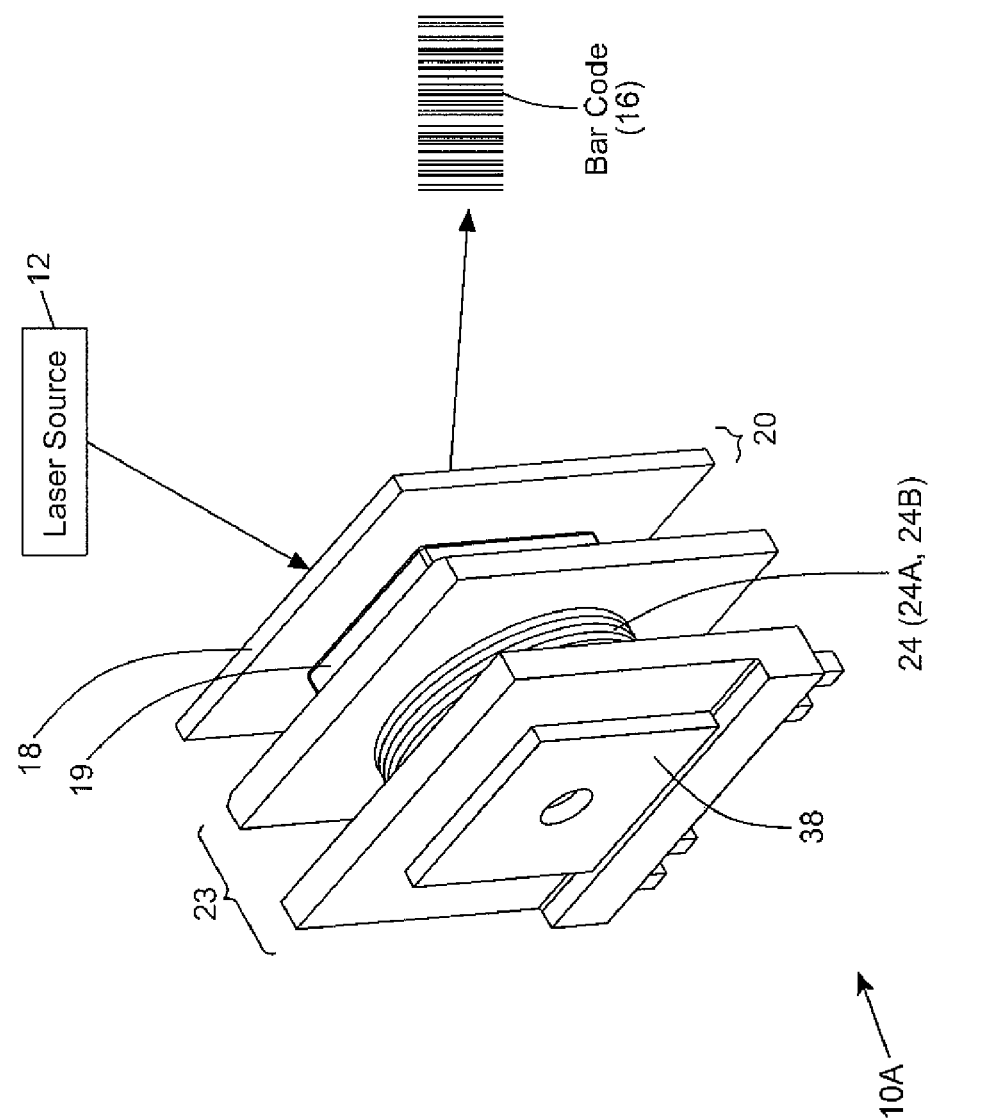
FIG. 2 is a schematic representation of the laser scanning assembly of the first illustrative embodiment schematically depicted in FIG. 1B, shown arranged with the laser beam source, and the photo-detector and scan data signal processing module, to provide a laser scanning module for use in various types of bar code symbol reading systems.
Figure 3A:
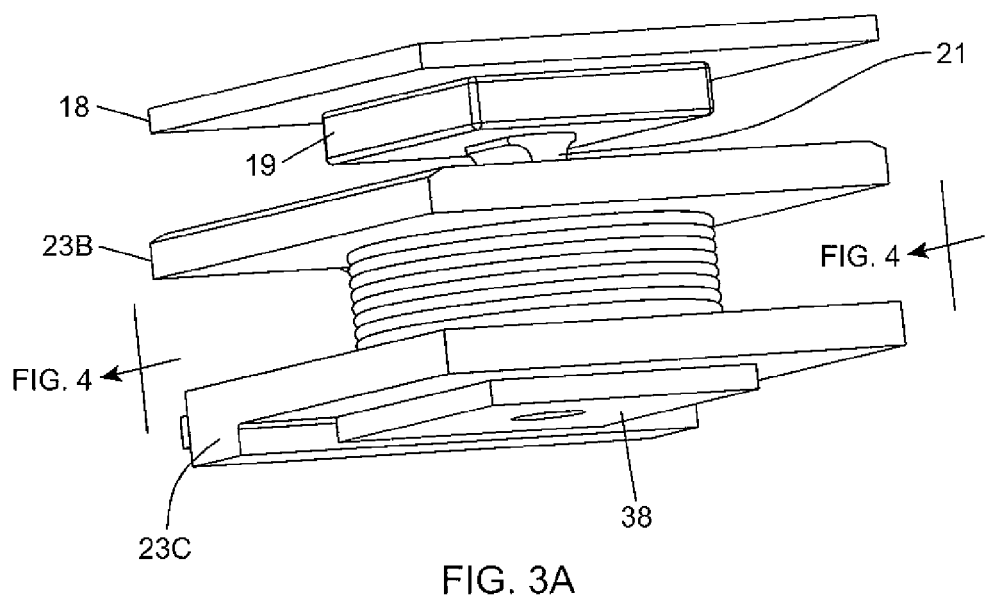
FIG. 3A is a first perspective view of the laser scanning assembly of the first illustrative embodiment, showing its mirror and magnet subassembly mounted to a molded elastomeric flexural element fabricated from silicone rubber and having post portion that is supported within a centrally located hole formed in a coil support element-like coil support element (i.e. coil body) supporting an electromagnetic coil about an imaginary axis that passes through the longitudinal axis of the molded elastomeric flexural element.
Figure 3B:
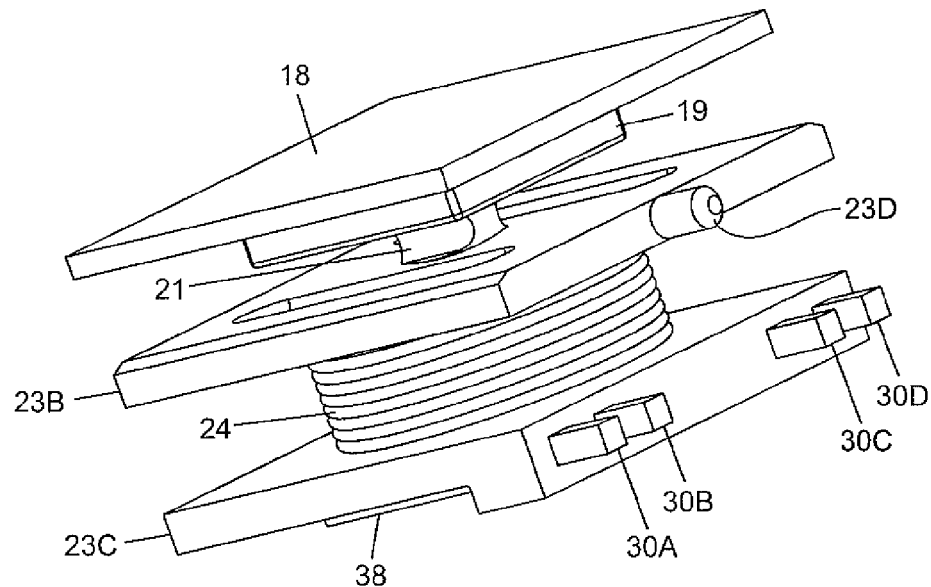
FIG. 3B is a second perspective view of the laser scanning assembly of the first illustrative embodiment, shown in FIG. 2.
Figure 3C:
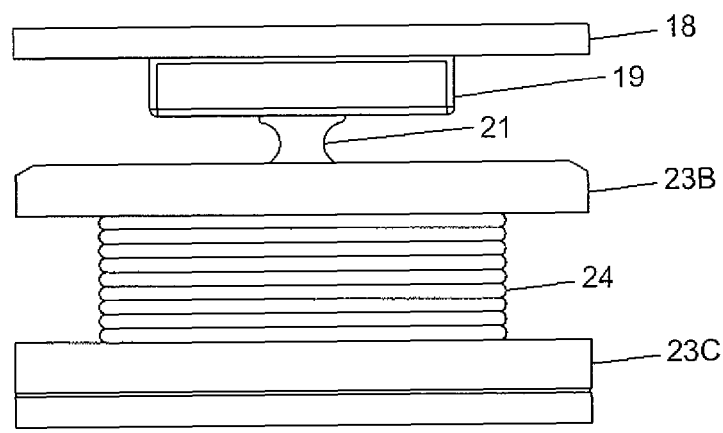
FIG. 3C is a plan view of the laser scanning assembly of the first illustrative embodiment, shown in FIG. 2.
Figure 3D:
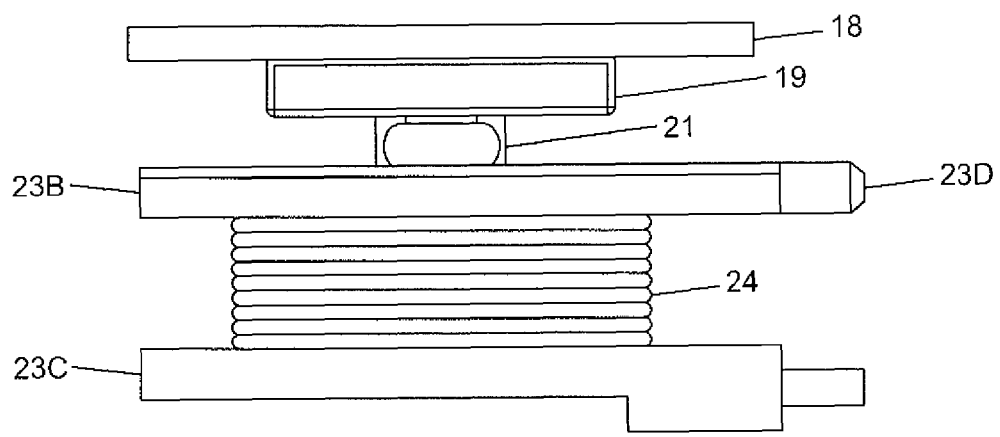
FIG. 3D is a first elevated side view of the laser scanning assembly of the first illustrative embodiment, shown in FIG. 2.

First Embodiment of the Laser Scanning Assembly Employing an First Illustrative Embodiment of the Molded Elastomeric Flexural Element As shown in FIG. 2, the first illustrative embodiment of the laser scanning assembly, indicated as 10A, comprises: a mirror and magnet subassembly 20 mounted to a molded elastomeric flexural element 21 fabricated from silicone rubber and having post portion 21A that is supported within a centrally located hole formed in a coil support element-like coil support element (i.e. coil body) 23 supporting an electromagnetic coil 24 about an imaginary central axis 25.

As shown in FIGS. 3A through 3D, the laser scanning assembly 10A comprises: a mirror 18 mounted to a permanent magnet 19 to form the mirror and magnet subassembly 20; a coil support element 23 having a core portion 23A with a pair of parallel flanges 23B and 23C disposed on opposite longitudinal ends of the core portion, and being adapted to support drive and sense electromagnetic coils 24A and 24B about the core portion 2, and having a central axis 25 that extends along the core portion 23A; and molded elastomeric flexural element 21 preferably, injection-molded from silicone rubber material, mounted between the mirror and magnet subassembly 20 and the coil support element 23, and has a longitudinal axis that transversely intersects the central axis of the core portion, and (i) supporting the mirror and magnet subassembly 20 in a substantially parallel spaced-apart relationship with respect to the upper flange portion (or surface) of the coil support element 23 when the drive coil 24A is not energized, and (ii) allowing the mirror and magnet subassembly 20 to oscillate about the longitudinal axis of the hinge-like flexural portion when the drive coil is energized, in either a resonant or off-resonant mode, depending on the construction of the laser scanning assembly.

Also, the coaxial support element 23 has a PC head mounting pin 23D for fixing the laser scanning assembly plane on a PC board in the module 5, when output pins 30A through 30E are soldered pin place.

Figure 4:
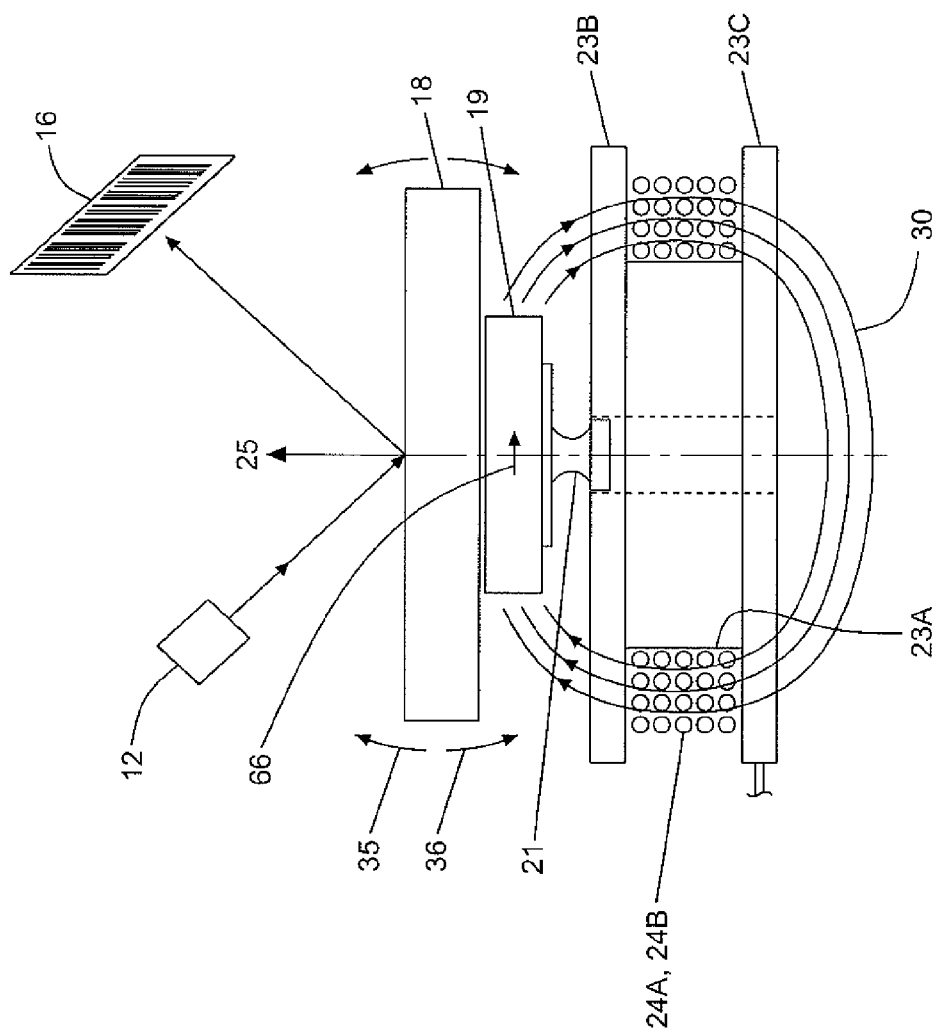
FIG. 4 is a cross-sectional view of the laser scanning assembly of the first illustrative embodiment, taken along line 4A-4A of FIG. 3A.

FIG. 4 shows a cross-section of the elastomeric laser scanning assembly 10A taken perpendicular to the central axis thereof 25. Preferably, at least one such cross-section has a length L, parallel to the longitudinal axis of rotation 26 of the mirror 18 and the magnet 19, that is larger than a width W that is perpendicular to the length L.

Figure 5A:
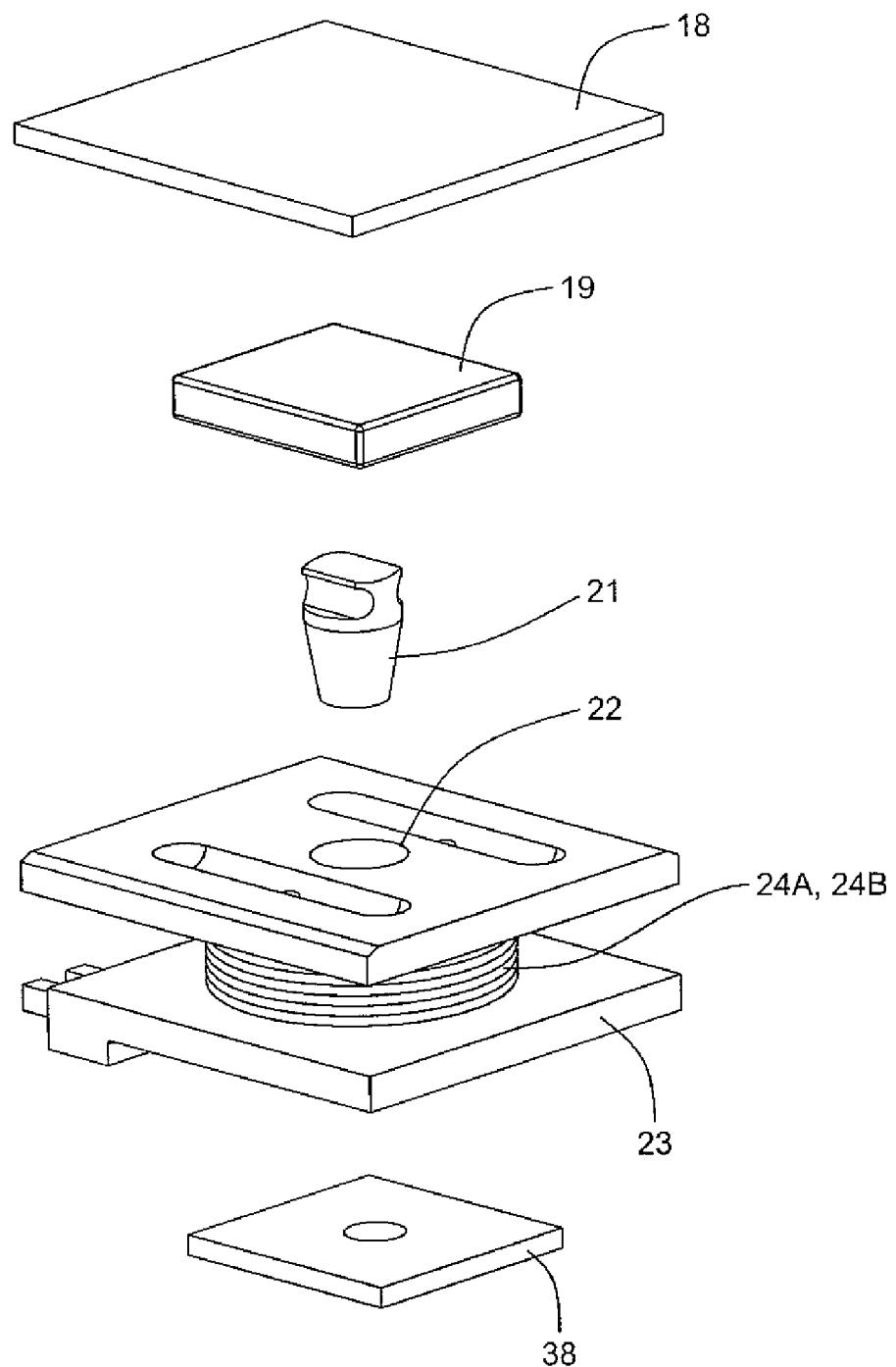
FIG. 5A is a first exploded view of the laser scanning assembly of FIG. 2, showing its mirror and magnet subassembly mounted to a molded elastomeric flexural element fabricated from silicone rubber and having support (i.e. base) portion that is supported within a centrally located hole formed in a coil support element-like coil support element adapted to support an electromagnetic coil about an imaginary axis that passes transversely through the longitudinal axis of the flexural element portion of the elastomeric molded flexural element.
Figure 5B:
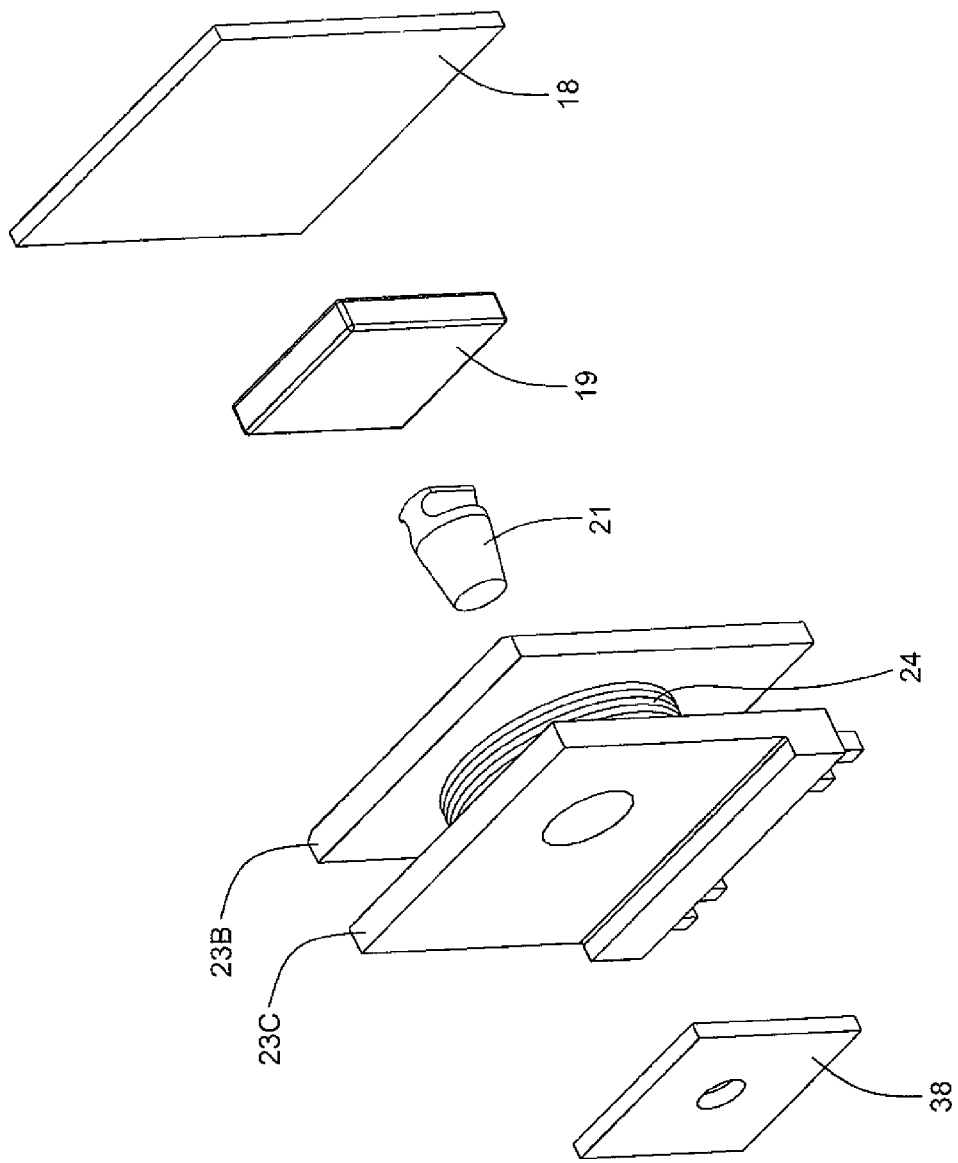
FIG. 5B is a first exploded view of the laser scanning assembly of FIG. 2, with its tuning plate.

FIG. 5A is an first exploded view of the laser scanning assembly 10A shown its primary components: mirror 18 mounted to permanent magnet 19 to form the mirror and magnet subassembly 20; coil support element 23 having core portion 23A with parallel flanges 23B and 23C disposed on opposite longitudinal ends of the core portion, and being adapted to support drive and sense electromagnetic coils 24A and 24B about the core portion, and having an imaginary central axis that extends along the core portion 23A; and molded elastomeric flexural element 21 preferably, injection-molded from silicone rubber material, mounted between the mirror and magnet subassembly 20 and the coil support element 23, as described above.

Preferably, flanges 23B and 23C radially extend beyond a circumference of the core portion 23A. Also, preferably, the wire drive and sense coils 24A and 24B are wound around the core portion 23A, about the central axis 25. As shown, a pair of input terminals 30A and 30B are provided to apply voltage signals across the drive wire coil 24A, although ends of the drive wire coil 24A may also be directly connected to a voltage source (not shown). Also, a pair of output terminals 30C and 30D are provided to sense current signals generated by the sense wire coil 24B when the drive coil is being driven by the circuit shown in FIG. 1C. Preferably, the coil support element 23 is molded of a non-magnetic material, such as plastic, but may also be manufactured from nylon or other high strength light-weight non-magnetic materials. The coil support element 23 may also be assembled from separate components.

Figure 6C:
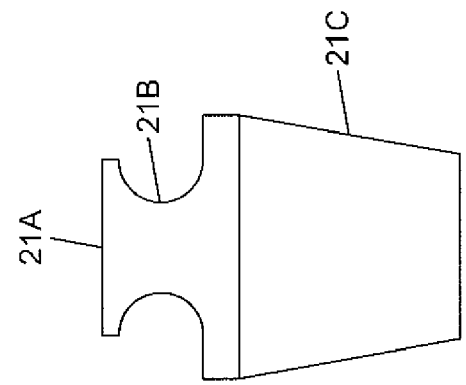
FIG. 6C is a first cross-sectional view of the molded elastomeric flexural element employed in the first illustrative embodiment, taken along plane formed by the intersection of the longitudinal and transverse axes shown in FIG. 6A.
Figure 6B:
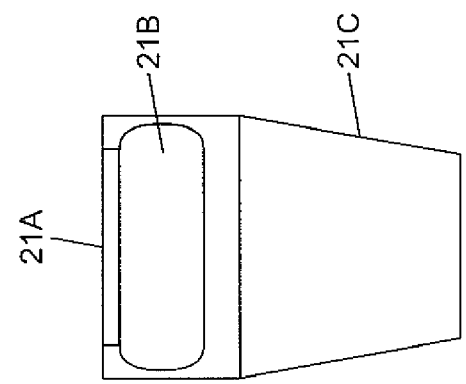
FIG. 6B is a first cross-sectional view of the molded elastomeric flexural element employed in the first illustrative embodiment, taken along the longitudinal axis shown in FIG. 6A.
Figure 6A:
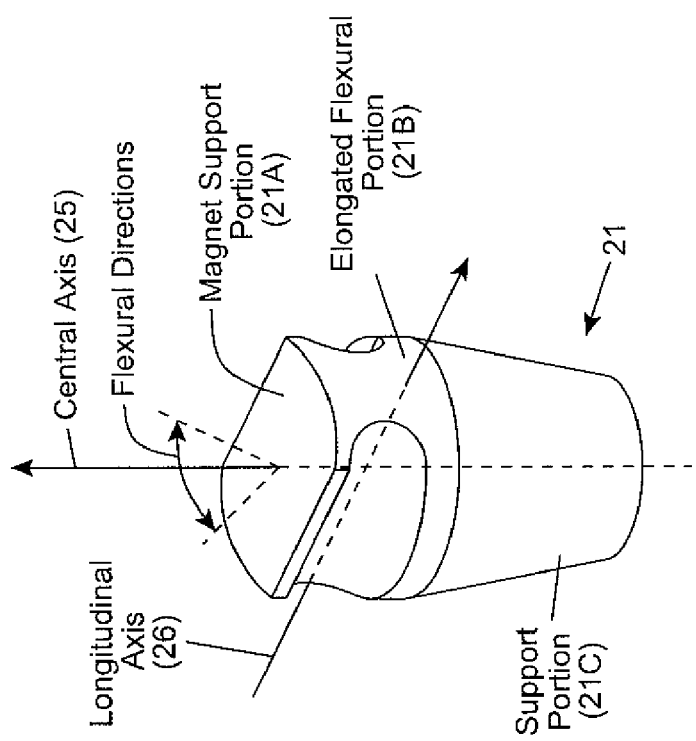
FIG. 6A is a first perspective view of the molded elastomeric flexural element employed in the first illustrative embodiment, showing its base support portion, elongated flexural portion and magnet support portion molded together in an integrated manner, and also showing (i) an imaginary longitudinal axis passing along the longitudinal dimension of the elongated flexural portion of the flexural element, (ii) an imaginary transverse axis passing along the central axis of the base support portion and transversely intersecting with the longitudinal axis in the central portion of the flexural element, and (iii) the linear (one-dimensional) deflection of the transverse axis in the direction of restricted flexure of the flexural flexural element portion of the elastomeric flexural element, during laser scanning operations illustrated in FIG. 4.
Figure 7:
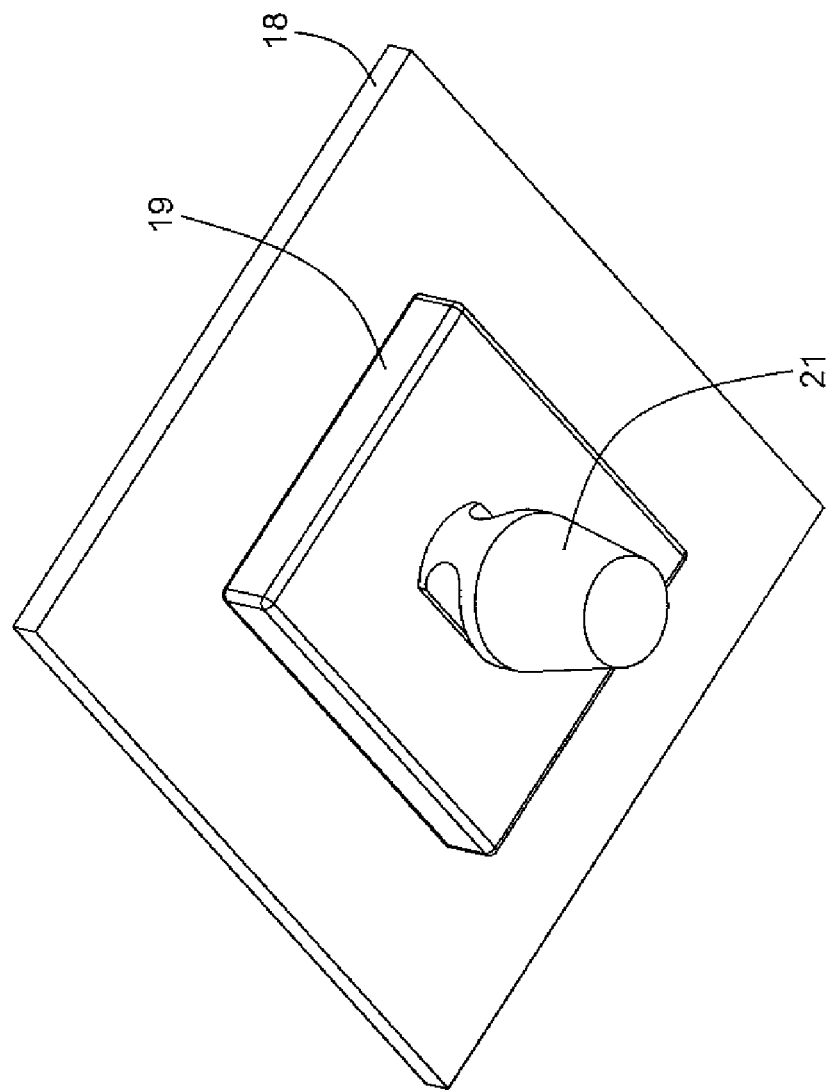
FIG. 7 is a perspective view of the molded elastomeric flexural element of FIGS. 6A through 6C, shown fixedly fastened to the magnet and mirror subassembly employed in the laser scanning assembly of the first illustrative embodiment shown in FIG. 3A.

As shown in FIG. 6A, the molded elastomeric flexural element 21 is an injection-molded elastomeric material component, having unique construction characterized by three primary portions which are integrally formed together, namely: a base support portion 21C for mounting within a hole or hole formed in the upper flange of the coil support element; an flexural hinge-like portion 21B having concave-like side wall characteristics which enable rotation of the molded silicone flexural element about the longitudinal axis of rotation 26, which is substantially transverse to the central axis 25; and magnet support portion 21A which has at least a planar portion that can be cemented or otherwise fixed to the magnet 19 using an adhesive material.

As shown in FIG. 6A, an imaginary longitudinal axis 26 passes along the longitudinal dimension of the flexural hinge-like portion of the molded flexural element, and intersects transversely (i.e. orthogonally) with the central axis 21 passing along the central axis of the base support portion. As such, the deflection of molded elastomeric flexure element 21 is constrained substantially along the longitudinal axis of rotation 26, for linear (i.e. 1D) laser beam scanning operations, schematically illustrated in FIG. 4.

The elastomeric flexural element is preferably injection-modeled from rubber material, and more preferably from a silicone rubber, for example a liquid silicone room temperature vulcanizing (RTV) resin or injection moldable silicone rubber. Alternatively, although less preferred, the elastomeric flexural element 21 can be fabricated from saturated or unsaturated rubbers, thermoplastic elastomers, or any other flexible or elastic material.

Preferably, the injection molding process includes the following steps: (a) providing a pair of mold halves that correspond the 3D geometry of the elastomeric flexural element; (b) joining the pair of mold halves together; (c) injecting liquid silicone material into the mold; (d) allowing time for curing; and (e) separating the mold halves and removing the injection-molded silicone flexural element.

As shown in FIG. 6A through 6C, the first and second ends 21C and 21A of the elastomeric flexural element 21 have cross-sectional areas larger than the intermediate portion (i.e. hinge-like flexural portion 21B). Thus, when the elastomeric flexural element 21 flexes, the thinner hinge-like flexural portion 21B helps to distribute internal stresses so that bonds at the first and second ends 21C and 21A are not over-stressed. The elastomeric flexural element 21 also produces a return force when flexed from its central position illustrated in FIG. 4. The elastomeric flexural element 21, particularly formed with silicone rubber, is therefore rugged, durable, and will not vary appreciably in its flexural properties when exposed to temperatures and other environmental conditions encountered in portable barcode reading applications.

The elastomeric flexural element 21 can be directly attached to the magnet 19 using appropriate bonding agents, adhesive promoting primers, and the like. Alternatively, however, the second end 21C of the elastomeric flexural element 21 can bonded to a first surface of a substrate (not shown). When used, the substrate is preferably formed from a non-magnetic material, such as a non-ferrous metal or suitable plastic. A second surface of the substrate is bonded to a first surface of a permanent magnet 19. While the substrate can be provided as a convenient mounting surface, particularly when utilizing liquid RTV silicone in formation of the elastomeric flexural element 21, and as a locating aid for accurate placement of the magnet 19, such a substrate is not required for proper operation of the laser scanning assembly 10A.

In FIG. 4, arrow 31 indicates a direction of magnetization of the magnet 19 with respect to the elastomeric flexural element(s) 21, the drive coil 24A, and the desired direction of dithering for mirror 18 (indicated by arrows ↑, ↓, → and ←). However, the magnetization direction may be adjusted to suit the desired oscillation orientation and subsequent beam pattern of the laser scanning assembly 10A, using the adjustment technique disclosed in FIG. 8A.

Preferably, mirror 18 is bonded directly onto a second surface of the permanent magnet 19. However, intermediate layers may be provided between the mirror 18 and the magnet 19. Therefore, the elastomeric flexural element 21 supports the magnet 19, (optional substrate) and the mirror 18 on the upper flange of coil support element 23.

As shown in FIG. 4, the coil support element 23, the elastomeric flexural element 21, the magnet 19, and the mirror 18 are all symmetrically oriented with respect to the central axis 25. That is, central axes (not shown) of magnet 19 and mirror 18 are coaxially aligned with the central axis of the drive coil 24A. The central axis 25 preferably passes through both the center of mass and the geometric centers of the coil support element 23, magnet 19, and mirror 18. The geometric symmetry of the above-listed components imparts balance to the moving parts (i.e., the mirror 18, magnet 19, and elastomeric flexural element 21), thereby rendering the laser scanning assembly 10A substantially immune to droop induced by gravity or other inertial disruptions. In alternative embodiments employing more than one elastomeric flexural element 21, the elastomeric flexural elements are preferably also oriented symmetrically with respect to the central axis 25, but need not be coaxial therewith (e.g., the elastomeric flexural elements 21 may each be symmetrically set a predetermined distance from the central axis 25).

In FIG. 4, magnetic flux lines 30 are shown emanating from and returning to opposite poles of the magnet 19. Accordingly, opposite poles of magnet 19 are simultaneously attracted to and repelled from coil 24A when current is introduced into therein. As alternating current is introduced into the coil 24A, a push-pull drive force exerted on the magnet 19 causes the mirror 18 to dither between the directions indicated by arrows 35 and 36.

According to the preferred embodiment, the mirror 18 rotates linearly through an angle in direct proportion to the current introduced into the coil 24A. As a result of the configuration of the laser scanning assembly 10A, both poles of the magnet 19 are simultaneously under constant influence of current introduced into the coil 24A. The laser scanning assembly 10A is therefore highly efficient, particularly below resonance and does not require careful frequency tuning to avoid resonance sensitivities. Further, the elastomeric flexural element 14 provides damping to the movement of the magnet 19 and mirror 18, minimizing unwanted ringing at the end points of the dithering motion when the laser scanning assembly 10A is driven with a triangular wave form, for example.

Further control of the magnet 19 and mirror 18 is achieved by the sense coil 24B wound around the coil support element 23. The sense coil 24B is used to obtain a current induced by the motion of the magnet 19 and incorporated into a feedback control circuit so that the amplitude of dithering is held constant, independent of temperature and aging effects. Further, detection of an induced current in the sense coil is also useful for determining if the laser scanning assembly 10A is malfunctioning so that the laser source may be powered off to protect a user from hazardous stray laser radiation that may be present if the beam ceases dithering.

During operation of the laser scanning mechanism 10A, laser light source 12 emits a laser beam 13A which is directed towards the surface of the mirror 18. Preferably the laser beam contacts the mirror close to the central axis 25, which is also the rotation axis of the mirror and magnet subassembly. When the drive coil 24A is energized with alternating current, the magnet 19 and the mirror 18 dither, reflecting the incident laser beam and producing a moving line scan beam across a barcode symbol target 16 located within the field of view (FOV) of the bar code symbol reader.

Manufacturing the Molded Elastomeric Flexural Element of the Illustrative Embodiment The laser scanning assembly shown in FIGS. 2 through 6C is adapted for relative high-speed linear scanning applications common in hand-supported bar code symbol reading applications.

In this illustrative embodiment, the dimensions of the coil support element 23 might be 0.35×0.35 inches, and the resonant frequency on the order of 55 to 65 HZ. The inner sense coil winding 24B can be realized using 500 turns of gage 44 magnet wire, and the outer drive coil winding 24A can be realized by winding a second sense winding of 600 turns of gage 44 wire about the drive coil winding.

The coil support element 23 is preferably made from plastic of high melting temperature, using injection-molding techniques well known in the art, and also capable of withstanding soldering of the wires to the pins for a short time without melting. An appropriate plastic for this component is polyphenelene sulfide (PPS). The two coil windings are terminated by soldering them to pins molded into the back of the coil support element, as shown in FIGS. 3A through 3D.

Preferably, the silicone flexural element 21 is injection-molded using injection moldable elastomeric silicone resin, having a hardness of typically 30 durometer shore A. The flexural element is shaped so that it preferentially flexes in one dimension and has a bottom portion with a keying feature in its bottom so that when it is seated in the central hole 22 formed in the coil support element 23, the flexural element 21 will be properly oriented. In the illustrative embodiment shown in FIGS. 2 through 6C, the height of the flexural hinge-like portion of the silicone flexural element is 0.032" inches, and the radius of curvature of the waist profile is 0.016" inches. The elongated length of the flexural element 21 is approximately 0.100" inches. The magnet 19 is 6 mm long in the horizontal scan direction and 4 mm wide and 1 mm thick. The mirror 18 is ½ mm thick glass.

To stabilize the flexural element after the injection-molding process, it is baked according to manufacturer's recommendations for a few hours. The baking may be done in batches. When the elastomeric element is cured, it is flexible and a magnet 19 and mirror 18 are sequentially added as previously described to form the laser scanning assembly 10A. The unique shape of the injection-molded silicone flexural element described above enables flexing at a low resonance frequency about its longitudinal axis of rotation, yet strongly resists flexing about the central axis of the drive coil, thereby enabling the production of straight non-split laser scanning lines.

While made from glass, the mirror can be made from coated plastic material. The magnet 19 should be realized by a strong permanent magnet, such as one made from zinc plated Neodymium Iron Boron (NdFeB). Also, typically the magnet 19 should be about one forth to three quarters the width of the coil support element 23 so that its lines of magnetic flux from the permanent magnet 19 substantially penetrate into the bulk of the wire coil, and preferably the outermost winding of the coil. Both sides of the magnet are primed with a silicone primer such as GE SS4004P, before mounting to the mirror and to the molded silicone flexural element 21.

Preferably, the entire structure is assembled by first placing a small amount of flowable silicone RTV, such as Dow Corning 734, onto the back of the mirror and then pressing the magnet 19 upon it to affect a thin glue bond. A second application of silicone RTV adhesive is made to the exposed surface of the magnet, and the flat side of the silicon flexural element is then positioned and pressed onto the magnet to affect a thin glue bond.

The central hole in the coil support element is primed with a silicone primer such as GE SS4004P. Preferably, the coil support element 23 has a hole 22 formed in its center, and at least partially closed at its rear. Then a measured quantity of silicone RTV is placed in the hole of the coil support element, and the base support portion (i.e. post portion) of the injection-molded silicone flexural element 21 is pressed into the hole 22, whereupon it becomes firmly anchored in the coil support element when the RTV silicone adhesive cures.

Preferably, the fabrication of the structure consisting of mirror, magnet and silicone flexural element is assembled using well known automatic pick and place assembly techniques.

Figure 8A:
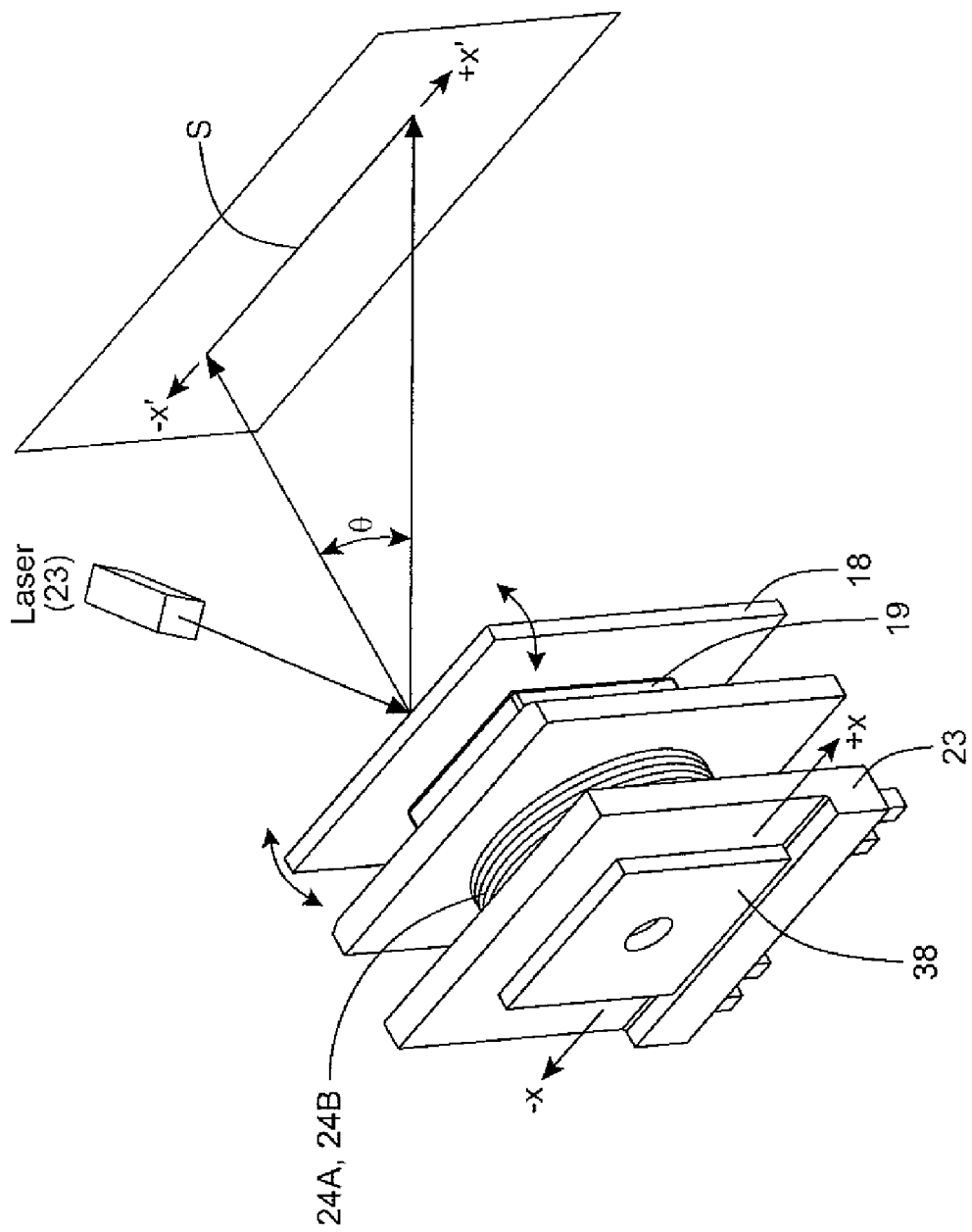
FIG. 8A is a schematic representation of an optical bench used to align the horizontal deflection of the laser scanning beam produced from the laser scanning assembly of the first illustrative embodiment, by a method involving adjusting the mounting of the horizontal position (x) of a ferrous tuning plate mounted to the rear surface of the coil support element employed in the laser scanning assembly.

Also, it is preferred, although not necessary, that a thin steel plate be added to the back of the coil support element for the purpose of adjusting (i) the position of the laser beam that reflects off the mirror using the technique taught in FIG. 8A, and (ii) the resonance frequency of the laser scanning assembly using the technique taught in FIGS. 8B and 9.

Figure 1C:
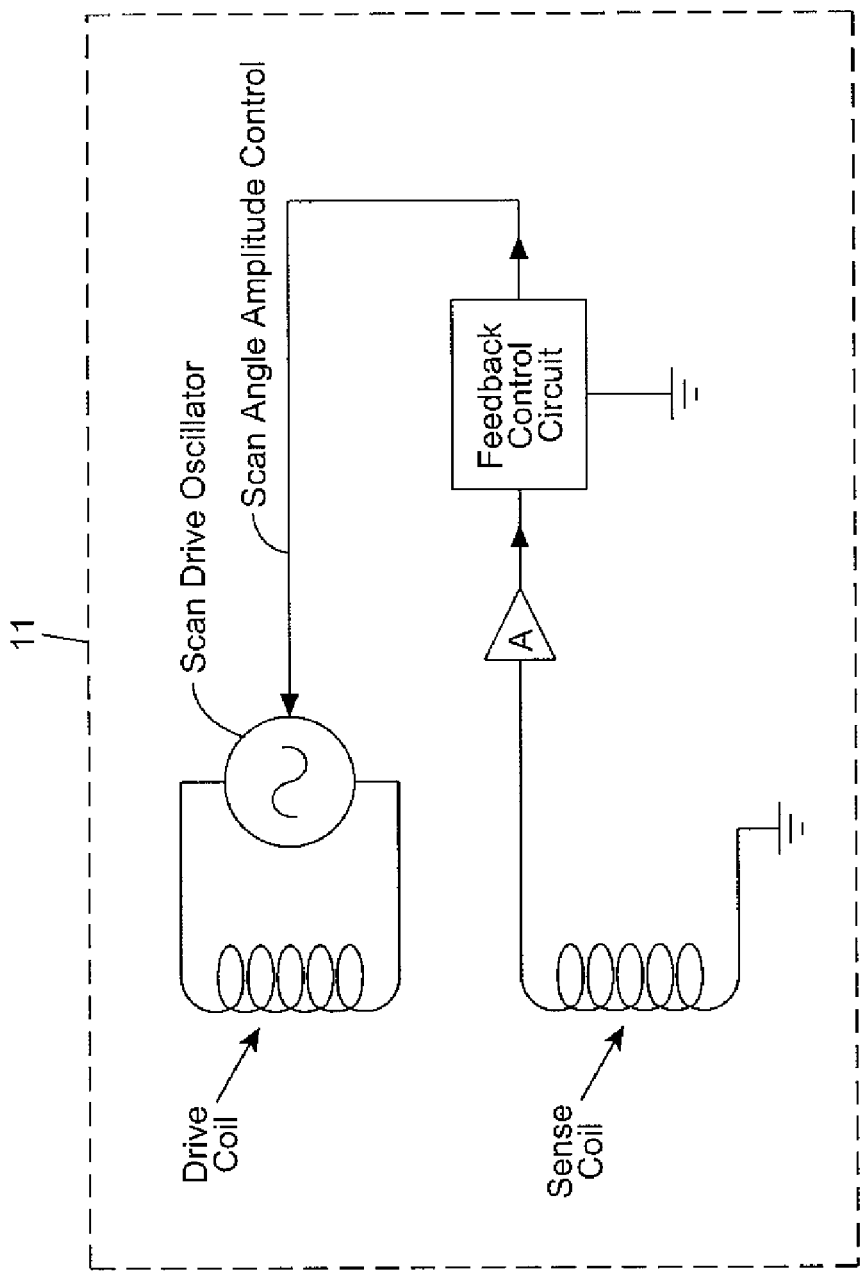
FIG. 1C is a schematic diagram of the drive and sense coils and circuitry for driving the same, in the laser scanning assembly of the first illustrative embodiment.

During operation of the laser scanning assembly 10A, an electrical drive voltage is applied to at least one of the coils, preferably the outer drive coil 24A. The inner sense coil 24B may also be used to drive the device, but generally, greater efficiency has been obtained by driving the outer winding. The inner central coil may then be used as a sense/control coil to generate a control signal that is used to control the degree of angular motion of the device either by monitoring the amplitude or phase of the signal received from the control coil, as shown in FIG. 1C. This control signal may then be used to influence the drive circuit to control the amplitude of scan angle desired. This is closed loop operation. It should be noted however that the properties of the injection-molded silicone elastomeric flexural element does not change much with time or temperature, and for many applications, closed feed back operation is not needed especially if the operating temperature range is from −40 degrees C. to 50 degrees [C.].

Centering the Laser Scanning Beam Produced from the Laser Scanning Assembly of the Illustrative Embodiments It has been discovered that, by adding a thin flat, high permeability piece of steel 38 to the back of the coil, and shifting the position of the steel piece to one side or the other, as needed, the laser scanning beam produced from the laser scanning assembly 10A can be centered. Once centered, the steel plate is fixed in place by gluing it preferably with a fast UV curing adhesive.

FIG. 8A shows an optical bench for use in aligning the horizontal deflection of the laser scanning beam produced from the laser scanning assembly of the first illustrative embodiment. This is achieved using a method involving adjusting the mounting of the horizontal position (x) of a ferrous tuning plate mounted to the rear surface of the coil support element employed in the laser scanning assembly.

As shown in FIG. 8A, the entire scan line S moves in the +X' direction when the tuning plate P is moved in the +X direction. Also, the entire scan line S moves in the opposite −X' direction when the tuning plate P is moved in the −X direction. Using this set up, the laser scanning beam can be quickly and simply centered in the factory, and the tuning plate located into position with a suitable adhesive well known in the art.

Tuning the Resonant Scanning Frequency of the Laser Scanning Assembly of the Illustrative Embodiments It has also been discovered that by adding a thin flat, high permeability piece of steel (i.e. non-magnetized ferromagnetic material) 38 of proper width W and thickness T (e.g. 0.020 inches), installed to the back of the coil support element 23, that the natural resonant frequency (i.e. resonance) of the laser scanning assembly 10A can be lowered without decreasing the efficiency in terms of the energy needed to dither it through the desired angle. The amount by which the resonant frequency is lowered depends upon the permeability, thickness, length and width of the steel and the distance by which it is separated from the magnet. Typically the steel plate is smaller in length and width than the back of the coil support element 23.

Notably, the resonant frequency of the laser scanning system (comprising its mirror, magnet, and molded silicone flexural element) is independent of the drive electronics employed. However, the drive electronics can force the system to oscillate at a frequency different than its resonance frequency. In general, the laser scanning assembly is operated at a frequency several cycles (measured in Hz) lower than its resonant frequency, helping to increase the starting time of scanning system.

FIG. 8B shows an optical bench for use in tuning the scanning frequency of the laser scanning assembly of the first illustrative embodiment. As illustrated in FIG. 9, as the width of plate 38 is increased in dimension W then the natural resonance frequency response curve A (without tuning plate) shifts toward Curve B (with tuning plate). As an example, for a coil 0.35 in width, if the bottom most minimum of response curve A occurs at 60 Hz with plate P having width W=0.15 inches, then the minimum resonant frequency response can be down shifted on the order of 10 Hz by making the plate 38 having an estimated width of 0.250 inch. Where the winding space is 0.60 wide and the flange thicknesses are 0.020, the flexural element itself with a mirror and magnet has a natural resonance frequency of about 65 Hz.

Thus, by using steel pieces of various lengths and widths resonance, beam shifting, beam positioning and efficiency effects can be tailored. An added benefit from the addition of the steel piece to the back of the coil support element is that it increases the efficiency of the laser scanning assembly by helping to concentrate magnetic flux through the drive coil.

Operation of the Drive and Sense Coils and Circuitry Employed in the Laser Scanning Assembly of the Illustrative Embodiment Operation of the drive and sense coils employed in the laser scanning assembly 10A will now be described in greater detail with reference to FIG. 1C.

As shown in FIG. 1C, a drive coil 24A wound about the cylindrical core portion 23C of the coil support element 23. Also, a sense coil 24B is wound about the drive coil 24A. When the drive coil is driven by a drive signal of a given voltage from the scan drive oscillator, the drive coil 24A generates a magnetic field 30 as shown in FIG. 4 and this exerts magnetic forces on the permanent magnet 19 mounted between the mirror 18 and the elastomeric flexural element 21. Such forces cause the elastomeric flexural element 21 to deflect in a direction orthogonal to its longitudinal axis 26, and the permanent magnet 19 automatically generates an EMF (i.e. a voltage sense signal) in the sense coil 24B as the moving magnet 19 dithers in a constrained manner. The peak amplitude of the sense signal corresponds to the peak speed of the magnet 19 as it moves which is directly related to the kinetic energy of the moving portion of the device (i.e. magnet, mirror, elastomeric flexural element), and hence is directly related to the angle of scan. The greater the kinetic energy imparted to the magnet by the current in the sense coil 24B, the greater will be the scan angle. Some energy is dissipated during each scan by the flexing of the flexural element 21 and through resistive losses in the drive coil winding.

The sense signal received from the sense coil 24B winding is received and amplified. Preferably the amplifier functions as a high impedance voltage amplifier so that the resistance of the coil which will change with temperature will have minimal effect upon the output of the sense amplifier. The signal from the sense amplifier is then passed to the scan control circuit. Typically the scan control circuit incorporates an internal reference to which the signal from the sense amplifier is compared. If the signal from the sense amplifier is too weak corresponding to too small a scan angle, then the scan control circuit forces the drive oscillator to supply more current to the drive coil thereby increasing the scan angle. If the signal received from the sense amplifier is too strong, then the scan control circuit will cause the current delivered to the drive coil to be smaller so as to reduce the scan angle.

An alternate method of adjusting the scan angle would be to have the scan control circuit adjust the frequency of the drive oscillator either by moving the frequency toward or away from the natural resonance of the system. For example, at the natural resonance frequency of the system, the maximum scan angle is achieved for a given value of drive current. If the current is held constant and the frequency varied away from the resonance frequency, then the scan angle will diminish.

Figure 10:
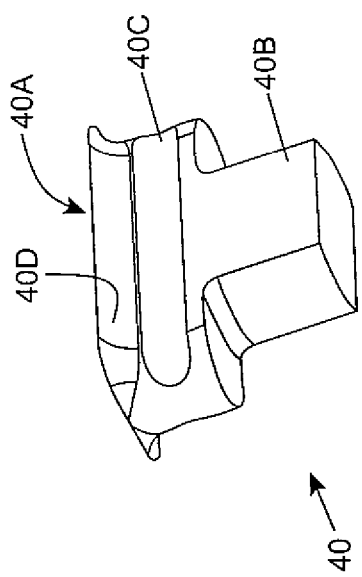
FIG. 10 is a perspective view of a second alternative embodiment of the elastomeric flexural element that can be used in the laser scanning assembly of the illustrative embodiments.
Figure 14:
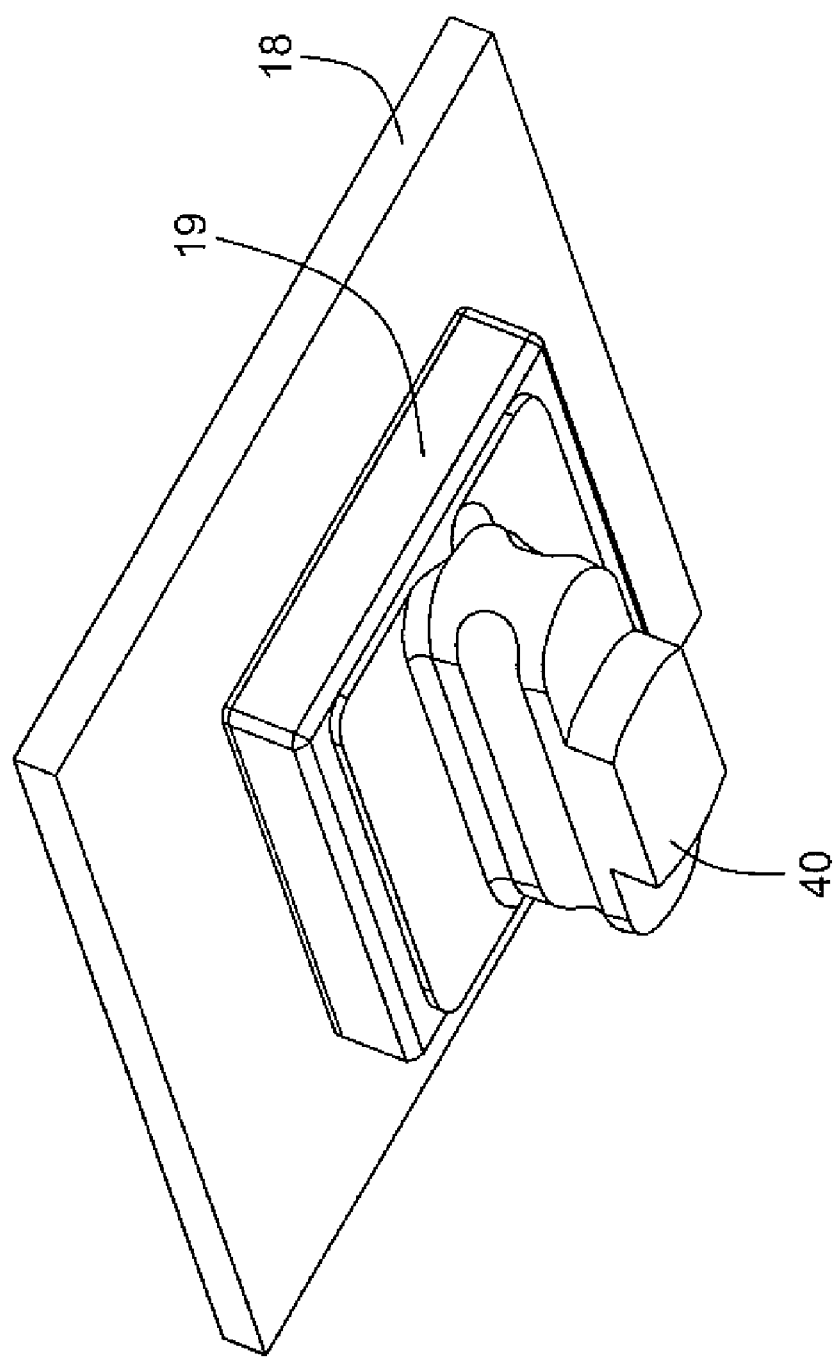
FIG. 14 is a perspective view of the elastomeric flexural element of FIG. 10 affixed to a mirror and permanent magnet subassembly used in the laser scanning assembly of the illustrative embodiment.

Second Embodiment of the Laser Scanning Assembly Employing a Second Alternative Molded Elastomeric Flexural Element FIG. 10 shows a second alternative embodiment of the elastomeric flexural element 40 that can be used in the laser scanning assembly of the illustrative embodiments. As shown, this embodiment of the molded elastomeric flexural element 40 has an elongated hinge-like flexural portion 40C, to support larger size mirror elements, for scanning and light collection purposes. Also, the magnet mounting portion 40A has a thickened region 40D along its base portion. FIG. 14 shows the elastomeric flexural element of FIG. 10 affixed to a mirror and permanent magnet subassembly, for use in a laser scanning assembly similar to the scanning subassembly described in FIGS. 2 through 7.

Figure 11:
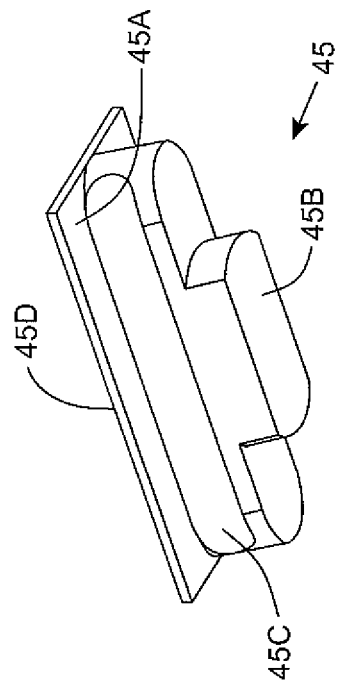
FIG. 11 is a perspective view of a third alternative embodiment of the elastomeric flexural element that can be used in the laser scanning assembly of the illustrative embodiments.
Figure 15:
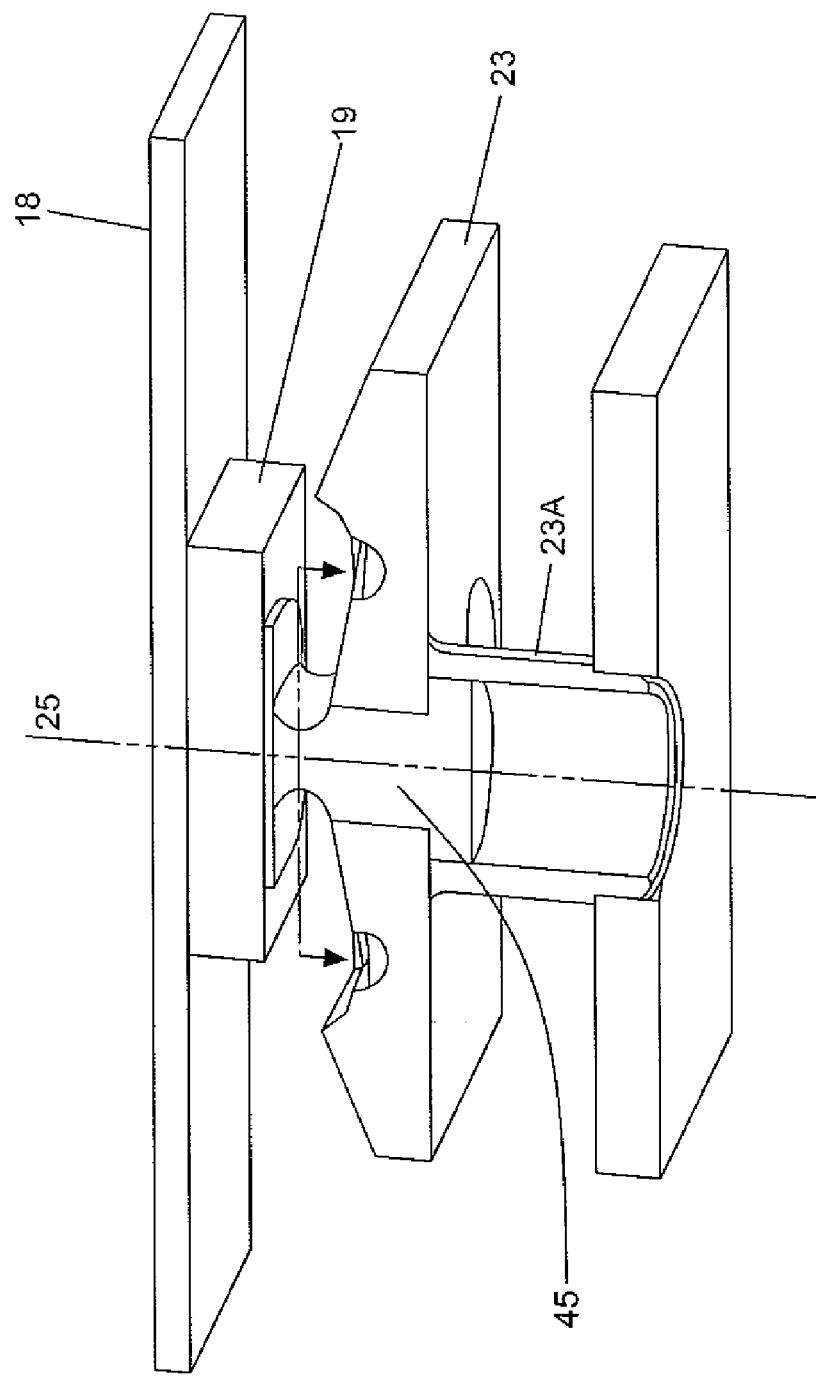
FIG. 15 is a perspective view of the elastomeric flexural element of FIG. 11 affixed to a mirror and permanent magnet subassembly used in the laser scanning assembly of the illustrative embodiment.

Third Embodiment of the Laser Scanning Assembly Employing a Third Alternative Molded Elastomeric Flexural Element FIG. 11 shows a third alternative embodiment of the elastomeric flexural element 45 that can be used in the laser scanning assembly of the illustrative embodiments. As shown, this embodiment of the molded elastomeric flexural element 45 has an elongated hinge-like flexural portion 45C, to support larger size mirror elements, for scanning and light collection purposes. Also the magnetic mounting portion 45A has an enlarged flange portion 45D which serves to facilitate mounting to the magnet 19. FIG. 15 shows the elastomeric flexural element of FIG. 11 affixed to a mirror and permanent magnet subassembly for use in a laser scanning assembly similar to the scanning subassembly described in FIGS. 2 through 7.

Figure 12:
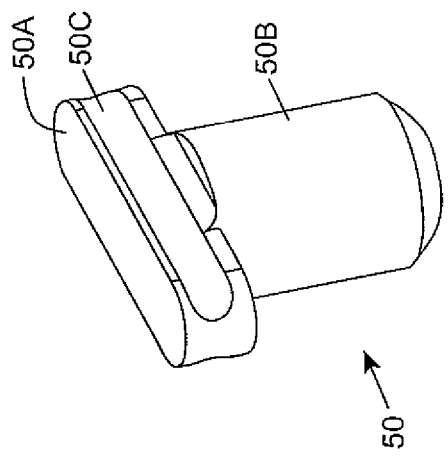
FIG. 12 is a perspective view of a fourth alternative embodiment of the elastomeric flexural element that can be used in the laser scanning assembly of the illustrative embodiment.

Fourth Embodiment of the Laser Scanning Assembly Employing a Fourth Alternative Molded Elastomeric Flexural Element FIG. 12 shows a fourth alternative embodiment of the elastomeric flexural element 50 that can be used in the laser scanning assembly of the illustrative embodiments. As shown, this embodiment of the molded elastomeric flexural element has an elongated hinge-like flexural portion 50C, to support larger size mirror elements, for scanning and light collection purposes. Also its base support portion 50B has an extended cylindrical geometry adapted for insertion with a large central hole formed through the coil support portion of the coil support element 23. The elastomeric flexural element of FIG. 11 can be affixed to a mirror and permanent magnet subassembly of any laser scanning assembly described herein, adapted for its enlarged size mirror.

Figure 13:
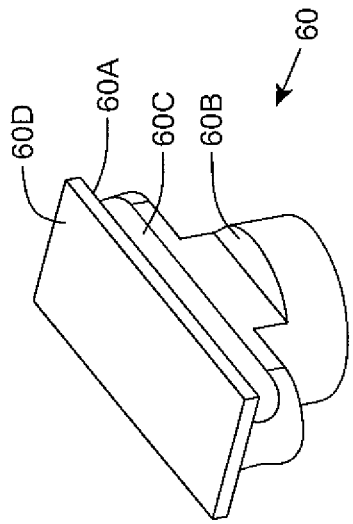
FIG. 13 is a perspective view of a fifth alternative embodiment of the elastomeric flexural element that can be used in the laser scanning assembly of the illustrative embodiment.
Figure 16:
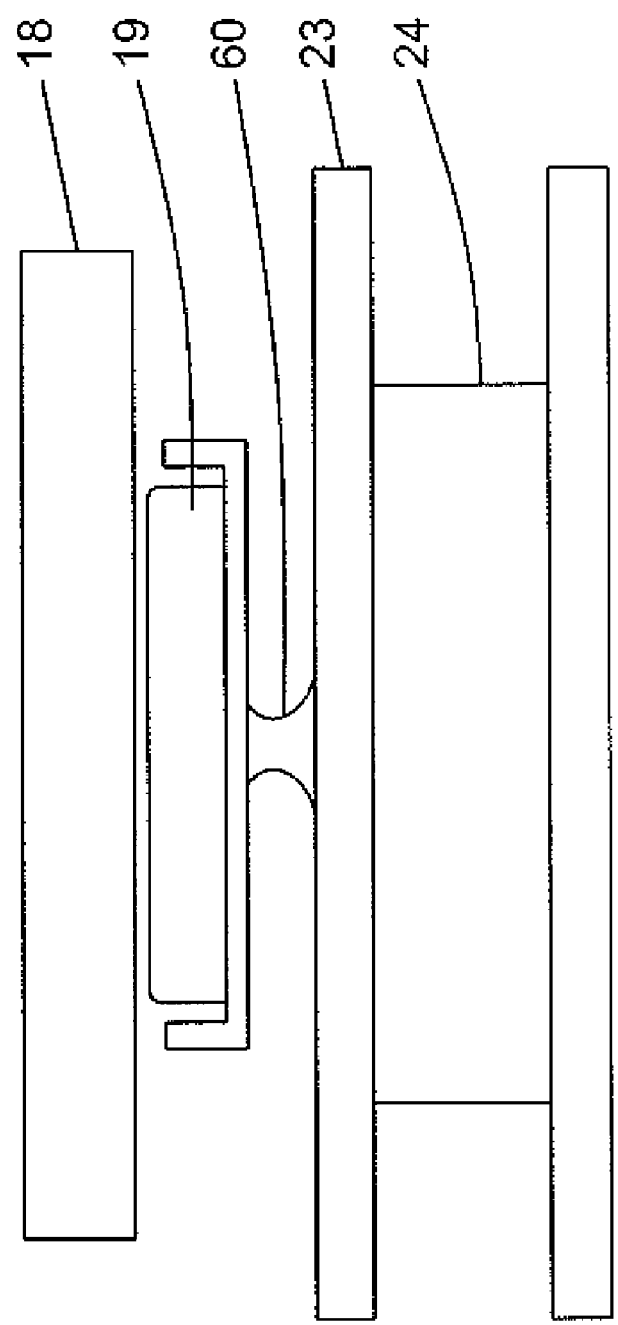
FIG. 16 is a perspective view of the elastomeric flexural element of FIG. 13 affixed to a mirror and permanent magnet subassembly used in the laser scanning assembly of the illustrative embodiment.

Fifth Embodiment of the Laser Scanning Assembly Employing a Fifth Alternative Molded Elastomeric Flexural Element FIG. 13 shows fifth alternative embodiment of the elastomeric flexural element 60 that can be used in the laser scanning assembly of the illustrative embodiment. As shown, the elastomeric flexural element 60 is shaped to hold the magnet 19 within a pocket 60D integrally formed as part of the magnet mounting portion 60A of the flexural element 60. The elongated intermediate portion 60C of the elastomeric flexural element 60 flexes as described above in other embodiments, and its base support portion 60B is mounted to the upper flange of the coil support element 23 using anchoring methods described above. FIG. 16 shows the elastomeric flexural element of FIG. 13 affixed to a mirror and permanent magnet subassembly for use in a laser scanning assembly similar to the scanning subassembly described in FIGS. 2 through 7.

Figure 17:
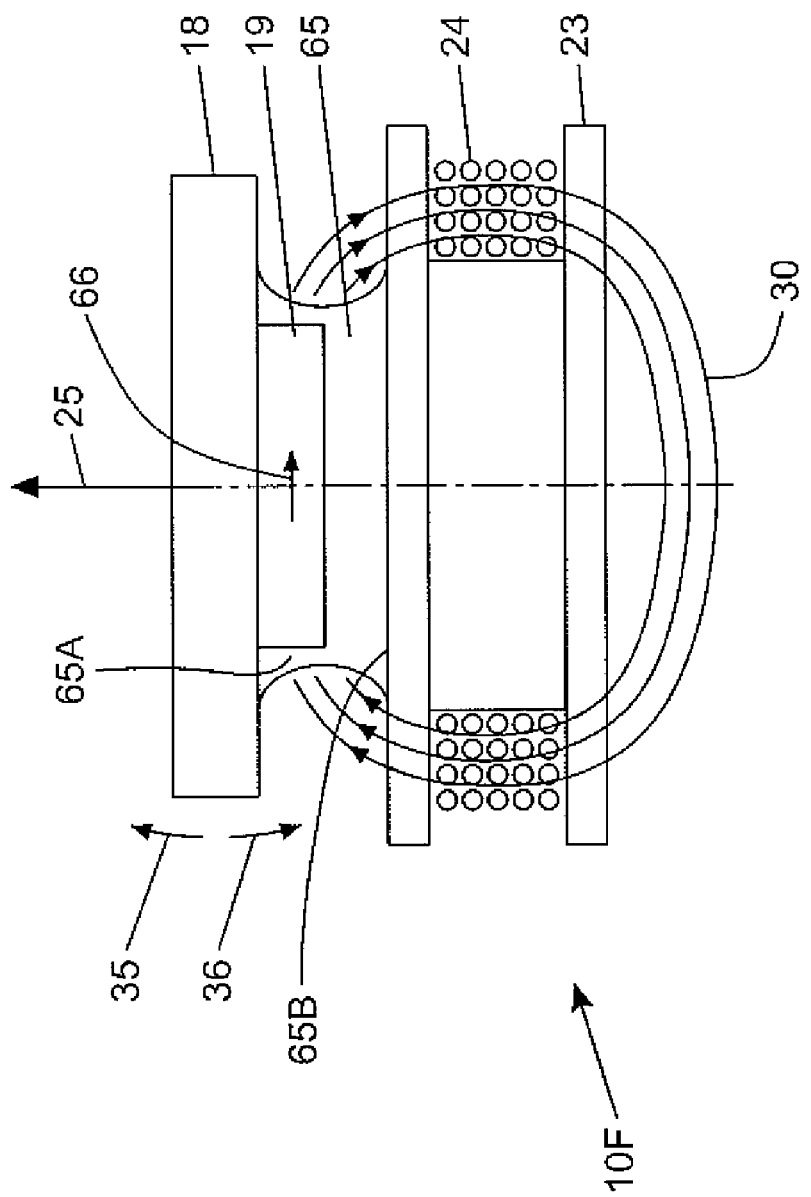
FIG. 17 is a perspective view of a sixth alternative embodiment of an elastomeric flexural element that is co-molded about the mirror component in a mirror and permanent magnet subassembly used in the laser scanning assembly of the illustrative embodiment.

Sixth Embodiment of the Laser Scanning Assembly Employing a Sixth Alternative Molded Elastomeric Flexural Element FIG. 17 shows a sixth illustrative embodiment of the laser scanning assembly 1OF having a magnet 19 which is co-molded within the magnet mounting portion 65A of an injection-molded elastomeric flexural element 65, while the mirror 18 is then mounted to the magnet mounting portion 65A, as shown. Preferably, in this illustrative embodiment, the injection-molded elastomeric flexural element 65 will have an elongated geometry, like the embodiments shown in FIGS. 10 through 13, for embodying the magnet in injection-molded silicone rubber or like material, and supporting an enlarged mirror.

As shown, the magnet 19 is embedded within the elastomeric flexural element 65 adjacent a second end 65A opposite to the first end 65B. Preferably, the method of manufacture involves the following steps: (a) providing a pair of mold halves that correspond the 3D geometry of the elastomeric flexural element; (b) inserting magnetic element 19 into at least one of the mold halves; (c) joining the pair of mold halves together; injecting liquid silicone material into the mold; (d) allowing time for curing; and (e) separating the mold halves and removing the injection-molded silicone flexural element. Then the mirror 18, with its reflective side facing away from the coil support element 23, is mounted to the second end of the elastomeric flexural element 65. The magnetization direction 66 of the magnet 19 is preferably generally transverse to a central axis 25 of the coil support element 23, with which the central axis (not shown) of the magnet 19 is coaxially aligned.

The attachment of the magnet 19 and silicone flexural element 65 to the mirror 18 is preferably performed by suitable adhesives or other attachment methods. The mirror 18 is preferably also glued or adhered to the magnet 19, but the magnet 19 need not be attached to the mirror 18 at all and may be entirely surrounded within the elastomeric flexural element 65. Similar to the embodiment shown in FIG. 2, central axes of the mirror 18, magnet 19, and elastomeric flexural element 65 are all coaxially aligned with the central axis 25 of the coil support element 23.

Figure 18A:
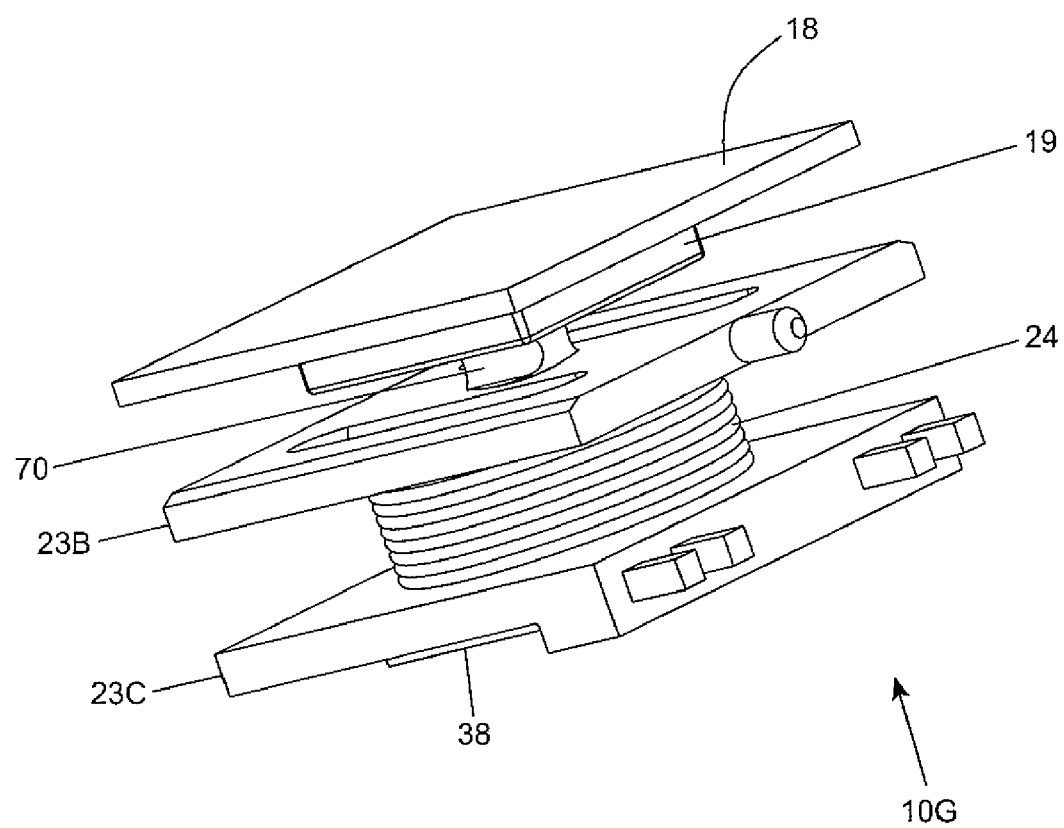
FIG. 18A is a perspective view of the laser scanning assembly of the seventh illustrative embodiment, showing its mirror and magnet subassembly mounted to a molded elastomeric flexural element fabricated from silicone rubber and having a pair of support portions (i.e. posts) that are supported within a pair of spaced-apart holes formed in a coil supporting element of the laser scanning assembly of the second illustrative embodiment.
Figure 18B:
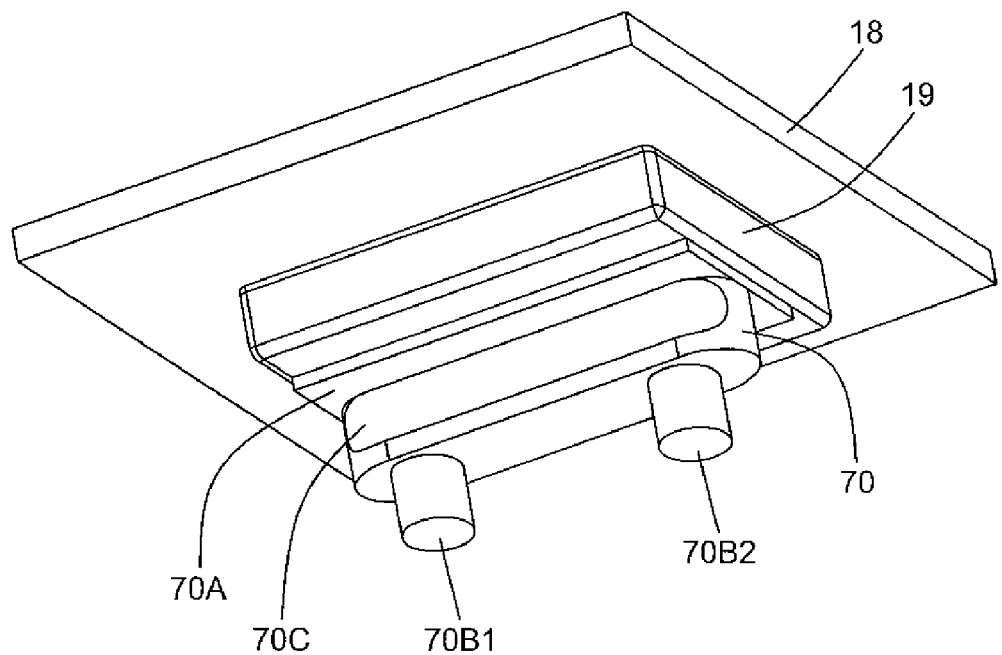
FIG. 18B is a perspective view of the elastomeric flexural element employed in the laser scanning assembly of FIG. 18A, shown affixed to the mirror and permanent magnet subassembly thereof and having a pair of spaced-apart support portions (i.e. posts) adapted to fit into a corresponding pair of spaced-apart holes formed in the top portion of the coil support element.
Figure 18C:
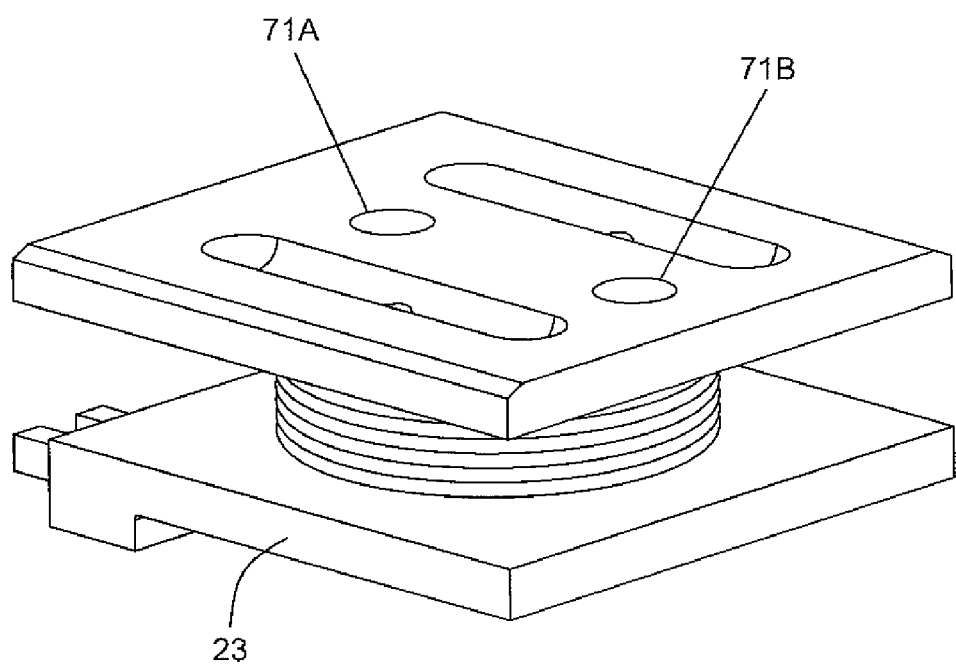
FIG. 18C is a perspective view of the coil and support element subassembly employed in the laser scanning assembly in FIG. 18A, showing its pair of spaced-apart holes formed in the top portion of the coil support element, for receiving the corresponding pair of spaced-apart support portions (i.e. posts) provided on the elastomeric flexural element shown in FIG. 18B.

Seventh Embodiment of the Laser Scanning Assembly Employing a Seventh Alternative Molded Elastomeric Flexural Element FIGS. 18A through 18C shows a seventh embodiment of the laser scanning assembly 10G, employing an elastomeric flexural element 70, preferably formed from injection-molded silicone rubber material. As shown in FIG. 18B, the base support portion 70B of the silicone flexural element 70 has a pair of spaced apart support posts 70B1 and 70B2, which are received into a pair of spaced apart holes 71A and 71B formed in the upper flange of the coil supporting element 23 of the laser scanning assembly 10G. Support posts 70B1 and 70B2 are preferably secured into holes 71A and 71B, respectively, using liquid adhesive (such as liquid silicone RTV resin), but may also be secured by a mechanical lock fitting and/or other techniques known in the art. In all other respects, the laser scanning assembly 10G is similar to laser scanning assembly 10A.

This embodiment of the laser scanning assembly is designed to work well when using relatively large mirrors, because using large mirrors will typically require the use of an elongated silicone flexural element 70, as shown in FIG. 18B. In this embodiment, the dual post support scheme helps to stiffen the flexural hinge-like portion of the molded silicone flexural element, and suppress oscillations beyond the longitudinal axis of rotation of the laser scanning assembly.

In hand-held scanning applications, users occasionally subject the scanner to impact, such as hammering the scanner on a counter after an unsuccessful barcode reading. This imparts great shock to the laser scanning assembly and severe damage may result. To further protect the laser scanning assembly in accordance with embodiments of the present invention, mechanical limit protection may be included in its design to prevent over-stressing of the elastomeric flexural elements.

For example, a limit plate can be attached to one or both flanges 23B and 23C of the coil support element 23. The limiting plates may be made of metal or plastic. An opening can be included in the limiting plate which restricts the movement of an extension of a substrate provided between the magnet 19 and magnet mounting portion of the elastomeric flexural element 21, or an extension from the mirror 18 In normal operation, the mirror 18, magnet 19 and the substrate will dither without touching the perimeter of opening, but when subjected to excessive shock along any axis, movement of the extension of the substrate will be limited by the size of the opening and further movement is thereby prevented, reducing the possibility of damage. The coil support element 23 may also include motion limiting protection parts (not shown) similar to limiting plates and the substrate in order to entirely limit destructive motion of the laser scanning assembly.

Also while a linear bar code symbol 16 has been shown in the drawings, it is understood that any kind of code symbol can be read using the code symbol readers disclosed herein, including 1D and 2D bar code symbologies, and data matrix symbologies.

It will be clear to one skilled in techniques of automated manufacturing that the assembly of the laser scanning assembly as described above can be readily automated using robotic pick and place tools and precision liquid dispensing equipment.

It will be appreciated by those skilled in the art that changes could be made to the embodiments described above without departing from the broad inventive concept thereof. It is understood, therefore, that the invention is not limited to the particular embodiments disclosed, but it is intended to cover modifications within the scope of the present invention as defined by the appended claims.

I claim:

1. A laser scanning assembly for use in scanning a light beam generated from a light source such a laser source, comprising:
   a coil support element having a central axis about which is wound an energizable electromagnetic wire coil;
   wherein said coil support element includes a flange oriented generally transverse to the central axis of said coil support element;
   an elastomeric flexural element having first and second ends;
   wherein said first end is coupled to said flange of said coil support element;
   a permanent magnet having first and second surfaces, a central axis, and a magnetization direction;
   wherein the first surface of said permanent magnet is supported by the second end of said at least one elastomeric flexural element;
   wherein the central axis of said permanent magnet is coaxial with the central axis of said coil support element;
   wherein said magnetization direction is oriented generally transverse to the central axis of said permanent magnet;
   a mirror having a central axis and is mounted on the second surface of said permanent magnet;
   wherein the central axis of said mirror is coaxial with the central axes of said coil support element and said permanent magnet; and
   wherein said elastomeric flexural element provides a return force when said permanent magnet and said mirror are rotated at an angle from the central axis during energization of said electromagnetic wire coil.

2. A laser scanning assembly comprising:
   a coil support element having a coil support portion having first and second end portions;
   an electromagnetic coil supported about said coil support portion;
   a molded elastomeric flexural element fabricated from silicone rubber and having
      a base support portion for mounting to said first end portion of said coil support element,
      a magnet mounting portion, and
      a hinge-like flexural portion connecting said base support portion and said magnet mounting portion in an integrated manner;

a longitudinal axis extending along said hinge-like flexural portion, and a central axis extending along said base support portion and transversely intersecting with said longitudinal axis; and a mirror mounted to a permanent magnet forming a mirror and magnet subassembly, and said permanent magnet being mounted to the magnet mounting portion of said molded elastomeric flexural element;

wherein when said electromagnetic coil is energized with electrical current, said electromagnetic coil generates a magnetic force field which interacts with the magnetic force field and causes said hinge-like flexural portion to flex and said mirror and magnet subassembly to oscillate about said longitudinal axis, allowing a laser beam incident on said mirror to be scanned across a scanning field.

3. A laser scanning assembly comprising:

a mirror mounted to a permanent magnet forming a mirror and magnet subassembly;

a coil support element having a core portion adapted to support a drive electromagnetic coil wound about said core portion, and a flange portion disposed on one end of said core portion, and said core portion having a central axis that extends along said core portion; and an elastomeric flexural element, made from silicone rubber material, having a magnet mounting portion, a base support portion and a hinge-like flexural portion interconnecting said magnet mounting portion and said base support portion in an integrated manner;

wherein said elastomeric flexural element is mounted between said mirror and magnet subassembly and said coil support element, and has a longitudinal axis that transversely intersects said central axis of said core portion; and wherein said magnet mounting portion is mounted to said mirror and magnet subassembly, and said base support portion is mounted to said coil support element, so that said elastomeric flexural element (i) supports said mirror and magnet subassembly in a substantially parallel spaced-apart relationship with respect to said upper flange portion of said coil support element when said drive coil is not energized, and (ii) allows said mirror and magnet subassembly to oscillate about the longitudinal axis of said elastomeric flexural element when said drive coil is energized.

* * * * *